US011201364B2

(12) United States Patent
Kawakami et al.

(10) Patent No.: US 11,201,364 B2
(45) Date of Patent: Dec. 14, 2021

(54) BATTERY PACK

(71) Applicant: SANYO Electric Co., Ltd., Daito (JP)

(72) Inventors: Satoshi Kawakami, Hyogo (JP); Masaya Nakano, Hyogo (JP); Takao Takatsu, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 55 days.

(21) Appl. No.: 16/615,258

(22) PCT Filed: Apr. 6, 2018

(86) PCT No.: PCT/JP2018/014675
§ 371 (c)(1),
(2) Date: Nov. 20, 2019

(87) PCT Pub. No.: WO2018/221004
PCT Pub. Date: Dec. 6, 2018

(65) Prior Publication Data
US 2020/0076022 A1 Mar. 5, 2020

(30) Foreign Application Priority Data

May 29, 2017 (JP) .............................. JP2017-106025

(51) Int. Cl.
*H01M 10/6553* (2014.01)
*H01M 10/44* (2006.01)
*H01M 50/543* (2021.01)

(52) U.S. Cl.
CPC ..... *H01M 10/6553* (2015.04); *H01M 10/441* (2013.01); *H01M 50/543* (2021.01)

(58) Field of Classification Search
CPC ........... H01M 10/441; H01M 10/6553; H01M 2200/103; H01M 50/20; H01M 50/502; H01M 50/543; H01M 50/581; Y02E 60/10
See application file for complete search history.

(56) References Cited

U.S. PATENT DOCUMENTS

2014/0272490 A1 9/2014 Han et al.
2014/0370365 A1* 12/2014 Kubota ............... H01M 10/052
429/156
(Continued)

FOREIGN PATENT DOCUMENTS

CN 104051704 A 9/2014
CN 104956519 A 9/2015
(Continued)

OTHER PUBLICATIONS

International Search Report dated Jun. 19, 2018, issued in counterpart application No. PCT/JP2018/014675, with English translation. (2 pages).

(Continued)

*Primary Examiner* — Victoria H Lynch
(74) *Attorney, Agent, or Firm* — Westerman, Hattori, Daniels & Adrian, LLP

(57) ABSTRACT

A battery pack includes a plurality of batteries that are chargeable and dischargeable, a battery holder that arranges the batteries at predetermined positions, and a bus bar that is a metal sheet fixed to electrode terminals of the batteries. The bus bar includes: a plurality of fixed terminals connected with the electrode terminals of the batteries; a base that connects the plurality of batteries with each other through the plurality of fixed terminals in series and/or in parallel; and fuse links that include ends connected with the fixed terminals, respectively, and roots that are connected with the base. The battery pack further includes a heat insulating member that tightly covers surfaces of the fuse links, and surfaces of the fixed terminals connected with the fuse links, respectively.

15 Claims, 13 Drawing Sheets

(56) References Cited

U.S. PATENT DOCUMENTS

2015/0364744 A1 12/2015 Takano et al.
2018/0166673 A1* 6/2018 Kataoka ............ H01M 10/4207

FOREIGN PATENT DOCUMENTS

| JP | 2015-97174 A | 5/2015 |
| JP | 2015-141801 A | 8/2015 |
| JP | 2016-066455 A | 4/2016 |
| JP | 2016-225065 A | 12/2016 |
| JP | 2017-84606 A | 5/2017 |

OTHER PUBLICATIONS

English Translation of Office Action dated Oct. 8, 2021, issued in counterpart CN Application No. 201880035110.8. (4 pages).

* cited by examiner

BATTERY PACK

TECHNICAL FIELD

The present invention relates to a battery pack that includes a battery holder that arranges a plurality of batteries at predetermined positions, and bus bars that connect the plurality of batteries with each other in series or in parallel. More specifically, the present invention relates to a battery pack that includes the bus bars that include fuse links melted by an overcurrent of the batteries.

BACKGROUND ART

A battery pack that includes bus bars that connect a plurality of batteries with each other in series or in parallel includes fuse links at the bus bars, and thus does not allow an overcurrent of the batteries (see PTLs 1 and 2).

Each of the bus bars is a metal sheet that connects the batteries with each other in series or in parallel. Each of the bus bars is made by cutting one metal sheet. In the bus bar, a base that connects the batteries with each other in series or in parallel, and fixed terminals connected with electrode terminals of the batteries are connected with each other by fuse links. The fixed terminals are connected with the base through the fuse links. Therefore, the fuse links are designed such that the fuse links melt when an electric current of the batteries, that is, an electric current that flows through the fixed terminals, exceeds an assigned electric current. The assigned electric current that melts the fuse links is adjusted by electrical resistance of the fuse links. Therefore, if the fuse links are metal sheets that are very conductive, an assigned electric current is adjusted by narrowing and lengthening the fuse links. Electrical resistance of a metal wire is generally in proportion to a length of the metal wire, and is in inverse proportion to an area of a cross section of the metal wire. Therefore, a value of electrical resistance of a fuse link made by cutting a metal sheet is increased by narrowing a width of the fuse link and lengthening a length of the fuse link. Therefore, the fuse link is narrowed and lengthened to increase the electrical resistance. Consequently, when an assigned overcurrent flows through the fuse link, the fuse link generates heat and melts.

CITATION LIST

Patent Literatures

PTL 1: Unexamined Japanese Patent Publication No. 2015-141801
PTL 2: Unexamined Japanese Patent Publication No. 2016-066455

SUMMARY OF THE INVENTION

Technical Problems

A fuse link is heated by Joule heat due to an overcurrent, and melts. Joule heat is determined by a product of a square of an electric current and electrical resistance. Therefore, an assigned electric current that melts a fuse link is determined by adjusting electrical resistance of the fuse link. Not to allow an overcurrent to flow through a battery when the battery is in an abnormal state, a fuse link is designed such that the fuse link surely melts when an assigned electric current flows through the fuse link. Further, preferably, a circuit is rapidly shut off when a battery is in an abnormal state. Therefore, it is important to melt a fuse link as rapidly as possible, and surely stop an overcurrent. A bus bar is made of a metal sheet that is very conductive. In other words, electricity easily flows through the metal sheet. Therefore, a width of a fuse link is narrowed, and a length of the fuse link is lengthened to increase its electrical resistance. However, a metal sheet that has a narrow width and is long has a physically low strength. Therefore, the metal sheet is likely to be broken by impacts, such as vibration or a fall.

As described before, electrical resistance of a fuse link of a bus bar needs to be adjusted to allow the fuse link to rapidly and surely melt when an assigned electric current flows through the fuse link. Especially to increase electrical resistance, a width of a metal sheet needs to be narrowed, and a length of the metal sheet needs to be lengthened. Further, not to allow the fuse link to be broken by impacts, such as vibration or a fall, a structure that increases strength of a fuse link is needed for a bus bar included in a battery pack and connected with batteries. The strength of the fuse link are increased by widening a width of a metal sheet or shortening a length of the metal sheet, to increase the impact resistance of the fuse link. However, high electrical resistance and high strength are inconsistent. Therefore, it has been thought that the high electrical resistance and the high strength are not satisfied simultaneously.

The present invention is developed to solve the above problems. It is an object of the present invention to provide a battery pack that effectively does not allow fuse links to be broken by vibration or an impact, and allows the fuse links to rapidly and surely melt when an overcurrent flows through the fuse links, and thus protects batteries.

Solutions to Problems

A battery pack according to an aspect of the present invention includes a plurality of batteries that are chargeable and dischargeable, a battery holder that arranges the batteries at predetermined positions, and a bus bar that is a metal sheet fixed to electrode terminals of batteries. The bus bar includes a plurality of fixed terminals connected with the electrode terminals of batteries, the base that connects the plurality of batteries with each other through the plurality of fixed terminals in series and/or in parallel, and fuse links that include ends that are connected with the fixed terminals, respectively, and roots that are connected with the base. The battery pack further includes a heat insulating member that tightly covers surfaces of the fuse links, and surfaces of the fixed terminals connected with the fuse links, respectively.

The above battery pack effectively does not allow the fuse links to be broken by vibration or an impact, and allows the fuse links to rapidly and surely melt when an overcurrent flows through the fuse links, and thus protects the batteries. The reason is that in the above battery pack, the heat insulating member tightly covers surfaces of the fuse links of the bus bar, and surfaces of the fixed terminals connected with the fuse links. In the battery pack, the heat insulating member tightly covers surfaces of the fuse links and surfaces of the fixed terminals. Therefore, both the fuse links and the fixed terminals are insulated from outside. Therefore, heat is allowed to accumulate in the fuse links when the batteries are in an abnormal state. Therefore, the fuse links rapidly melt. For example, if thermal runaway occurs in a battery due to internal short circuit, a temperature of the battery rapidly increases. Thermal energy is released from the battery to outside. However, since the heat insulating member tightly covers surfaces of the fuse links and surfaces of the fixed terminals, release of heat from the surfaces to outside is reduced. Therefore, heat accumulates in the fixed terminals and the fuse links. Therefore, heat generated in the battery is effectively transferred to the fuse links through the fixed terminals. Consequently, the fuse links are rapidly heated. When internal short circuit occurs in a battery, a large short-circuit electric current flows through the battery. Therefore, the large short-circuit electric current generates Joule heat at the fuse links. Since the heat insulating member tightly covers surfaces of the fuse links, heat accumulates in the fuse links. Therefore, the fuse links are effectively heated by the Joule heat. Therefore, temperatures of the fuse links rapidly increase to a melting point. Consequently, the fuse links rapidly melt, and rapidly stop a large short-circuit electric current that flows through the battery.

As described before, the heat insulating member covers surfaces of the fixed terminals. While the fixed terminals reduce release of heat energy that has been generated in a battery to outside, heat is efficiently transferred to the fuse links from the electrode terminals, and thus the fuse links are heated. Heat transfer from the fixed terminals to the fuse links efficiently heats the fuse links. In addition, the heat insulating member covers surfaces of the fuse links. Therefore, release of Joule heat that is generated by an overcurrent that flows through the fuse links is reduced. Therefore, the battery pack rapidly increases a temperature of the fuse links. That is, when a battery is in an abnormal state, heat that is generated in the battery is efficiently transferred to the fuse links through the fixed terminals, and thus the fuse links are heated. In addition, an overcurrent that flows through the fuse links generates Joule heat, and release of Joule heat to outside is reduced, and thus the fuse links are efficiently heated. Due to the two effects of the battery pack, temperatures of the fuse links rapidly increase to a melting point, and the fuse links melt. Therefore, the battery is surely protected.

Further, in the above battery pack, the heat insulating member tightly covers surfaces of the fuse links and surfaces of the fixed terminals. Therefore, temperatures of the fuse links rapidly and efficiently increase to a melting point. Therefore, even if an area of a transverse cross-section of the fuse links is designed to be increased, for example, even if a width of the fuse links that are metal sheets is increased or even if a length of the fuse links are is designed to be shortened, temperatures of the fuse links surely increase to a melting point when a battery is in an abnormal state, and the fuse links melt. Such a battery pack that allows a width of the fuse links to be widened, or allows a length of the fuse links to be shortened increases strength of the fuse links. Therefore, the battery pack effectively does not allow the fuse links to be broken by impacts, such as vibration and a fall.

Further, in the above battery pack, the heat insulating member tightly covers surfaces of the fuse links and surfaces of the fixed terminals. Therefore, the battery pack effectively does not allow the fuse links and the fixed terminals to move relative to the base of the bus bar when the battery pack receives vibration or an impact. The reason is that the heat insulating member that covers surfaces of the fuse links and surfaces of the fixed terminals does not allow movement of the fuse links and movement of the fixed terminals. Such a battery pack that does not allow the fuse links and the fixed terminals to move relative to the base improves impact resistance. In various applications, the battery pack does not lose a fuse function, and is safely used.

In a battery pack according to another aspect of the present invention, the heat insulating member may be made of a potting resin. In the above battery pack, the heat insulating member is made of the potting resin. Therefore, the heat insulating member that tightly covers surfaces of the fuse links and surfaces of the fixed terminals is easily made by filling the potting resin on the surfaces of the fuse links and the surfaces of the fixed terminals. Further, manufacturing cost is reduced by minimizing an amount of potting resin used to cover the surfaces of the fuse links and the surfaces of the fixed terminals.

In a battery pack according to another aspect of the present invention, the heat insulating member includes a cover into which resin is molded, and the cover is tightly fixed to surfaces of the fuse links and surfaces of the fixed terminals connected with the fuse links.

In the above battery pack, the cover into which resin is molded is fixed to a surface of the bus bar, and thus tightly covers the fuse links and the fixed terminals. Therefore, the surface of the bus bar may be covered with a cover that has been preliminarily manufactured in another step. Therefore, a manufacturing time is reduced. Further, due to the structure, the fuse links and the fixed terminals are always similarly covered by manufacturing covers that each have a same shape and a same thickness. Therefore, a time it takes for the fuse links to melt is constant. Therefore, the fuse links stably melt when an assigned electric current flows through the fuse links.

In a battery pack according to another aspect of the present invention, the bus bar includes the plurality of fuse links, and the heat insulating member is integrally molded to tightly cover surfaces of all the fuse links of the bus bar.

In the above battery pack, the bus bar includes the plurality of fuse links, and the heat insulating member is integrally molded to tightly cover surfaces of all the fuse links. Therefore, the heat insulating member uniformly covers the fuse links, and a time for which the heat insulating member is molded is reduced. Since the heat insulating member uniformly covers surfaces of all the fuse links of the bus bar, the fuse links are stably heated, and the fuse links surely melt when an assigned electric current flows through the fuse links.

In a battery pack according to another aspect of the present invention, the heat insulating member is on a whole surface of the bus bar.

In the above battery pack, the heat insulating member is on a whole surface of the bus bar. Therefore, a manufacturing time is reduced, and the heat insulating member covers the plurality of fuse links and the fixed terminals of the bus bar. Especially if the heat insulating member is made of a potting resin, surfaces of the fuse links and surfaces of the fixed terminals are uniformly covered by applying the potting resin on a whole surface of the bus bar. Further, a thickness of the heat insulating member becomes uniform. If the heat insulating member is the cover, an outer shape of the cover and an outer shape of the bus bar are equalized. Consequently, a whole surface of the bus bar is easily covered with the cover, and the cover is disposed at a predetermined position.

In a battery pack according to another aspect of the present invention, the battery holder puts the plurality of batteries parallel to each other, and arranges, on same planes, the electrode terminals at both ends of the batteries, and the bus bar connects the electrode terminals of the batteries with each other at each of both surfaces of the battery holder. Further, the battery holder includes a positioning hollow on each of both the surfaces on which the electrode terminals of the batteries are arranged, the bus bar is disposed in the positioning hollow, and the heat insulating member is disposed in the positioning hollow.

In the above battery pack, the bus bar is disposed in the positioning hollow on each of both the surfaces of the battery holder, and the heat insulating member is disposed in the positioning hollow. Therefore, an inner wall of the positioning hollow functions as a boundary wall, and the heat insulating member is precisely disposed relative to a surface of the bus bar. If the potting resin is filled to form the heat insulating member, for example, the inner wall of the positioning hollow of the battery holder also functions as a peripheral wall of an area where the potting resin is filled. Consequently, the potting resin does not spread outside the positioning hollow, and the potting resin is efficiently filled. If the heat insulating member is the cover, the inner wall of the positioning hollow of the battery holder also functions as a positioning wall used to position a peripheral edge of the cover. Consequently, the cover is easily disposed at a precise position.

In a battery pack according to another aspect of the present invention, the base includes fuse-link connecting portions that are connected with the roots of the fuse links, respectively, and the fuse-link connecting portions include first fitting portions, respectively, battery holder includes second fitting portions, and the second fitting portions are connected with the first fitting portions, respectively, and thus the second fitting portions are connected with the fuse-link connecting portions, respectively, the second fitting portions are connected with the first fitting portions, respectively, and thus the fuse-link connecting portions are connected with the battery holder, and the heat insulating member fixes connections between the first fitting portions and the second fitting portions.

In the above battery pack, the fuse-link connecting portions are connected with roots of the fuse links, respectively. The fuse-link connecting portions include the first fitting portions, respectively. The second fitting portions of the battery holder are connected with the first fitting portions, respectively. Consequently, the fuse-link connecting portions are connected with the battery holder. Consequently, the fuse links are connected with the battery holder in such a manner that the fuse links do not move relative to the battery holder. Further, the heat insulating member fixes connections between the first fitting portions and the second fitting portions. Therefore, the heat insulating member fixes both the battery holder and the fuse-link connecting portions at predetermined positions. Therefore, the fuse links and the batteries surely do not move relative to each other. Therefore, even if the above battery pack receives an impact, such as a fall, the fuse links and the batteries do not move relative to each other. Consequently, the fuse links are not damaged.

In a battery pack according to another aspect of the present invention, the base of the bus bar includes a positioning hole between the fixed terminals that are adjacent to each other. The battery holder includes a positioning rib that is guided by the positioning hole and is connected with the bus bar. The positioning rib is connected with the positioning hole, and thus the bus bar is connected with the battery holder. Further, the heat insulating member fixes a connection between the positioning hole and the positioning rib.

In the above battery pack, the positioning rib of the battery holder is connected with the positioning hole of the base of the bus bar. Consequently, the bus bar is connected with the battery holder. Further, the heat insulating member fixes a connection between the positioning hole and the positioning rib. Therefore, the heat insulating member stably fixes the bus bar at a predetermined position on the battery holder.

DESCRIPTION OF EMBODIMENTS

Figure 1:
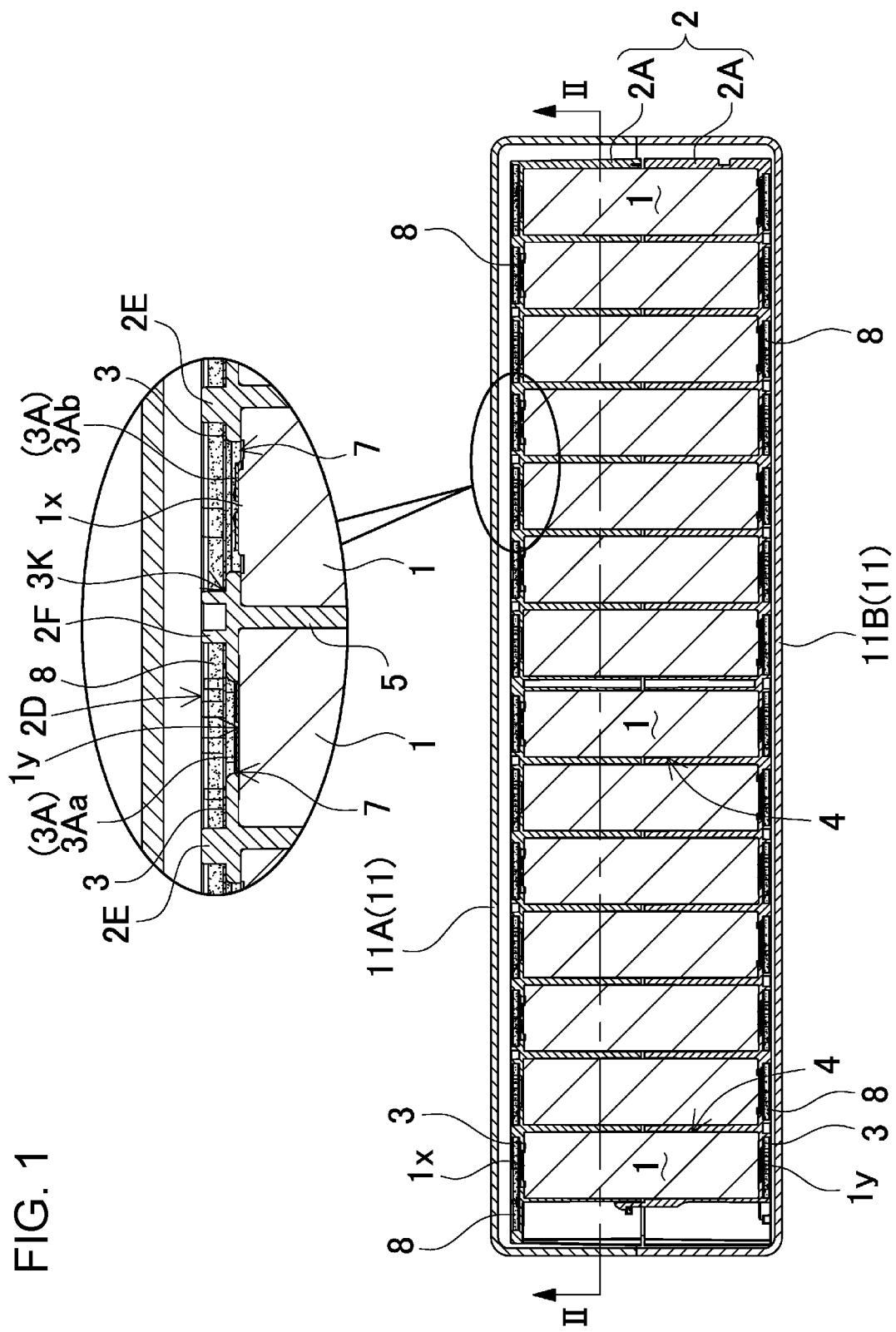
FIG. 1 is a horizontal cross-sectional view of a battery pack according to an exemplary embodiment of the present invention, and is a drawing that corresponds to a cross section taken along line I-I in FIG. 2.

Hereinafter, exemplary embodiments of the present invention will be described with reference to the drawings. However, the exemplary embodiments described later exemplify battery packs that embody a technical idea of the present invention. The present invention is not limited to the battery packs described later. The present description should never limit members recited in the claims to members according to the exemplary embodiments. In particular, it is not intended to limit the scope of the present invention to sizes, materials, and shapes of components and relative arrangement between the components, which are described in the exemplary embodiments, unless otherwise specified. The sizes, materials, and shapes of components and relative arrangement between the components are mere examples for explanation. Sizes and positional relation of components in the drawings may be exaggerated for clear explanation. Furthermore, in the following description, same names or same reference marks denote same components or same types of components, and detailed description is therefore appropriately omitted. Regarding elements that constitute the present invention, one component may constitute a plurality of elements of the elements, or one component may serve as a plurality of elements of the elements. On the other hand, a function of one component may be shared by a plurality of components.

The battery pack according to an aspect of the present invention is mainly used as a power source for motor. The battery pack is used as a power source for electric motor equipment operated by a motor, such as electric tools, electric-assist bicycles, electric motorcycles, electric wheelchairs, electric tricycles, and electric carts. However, the present invention does not limit applications of the battery pack. In addition to the above electric equipment, the battery pack may be used as a power source for various electric equipment except electric motor equipment, such as cleaners, transceivers, lights, digital cameras, and video cameras that are used indoors or outdoors.

Figure 2:
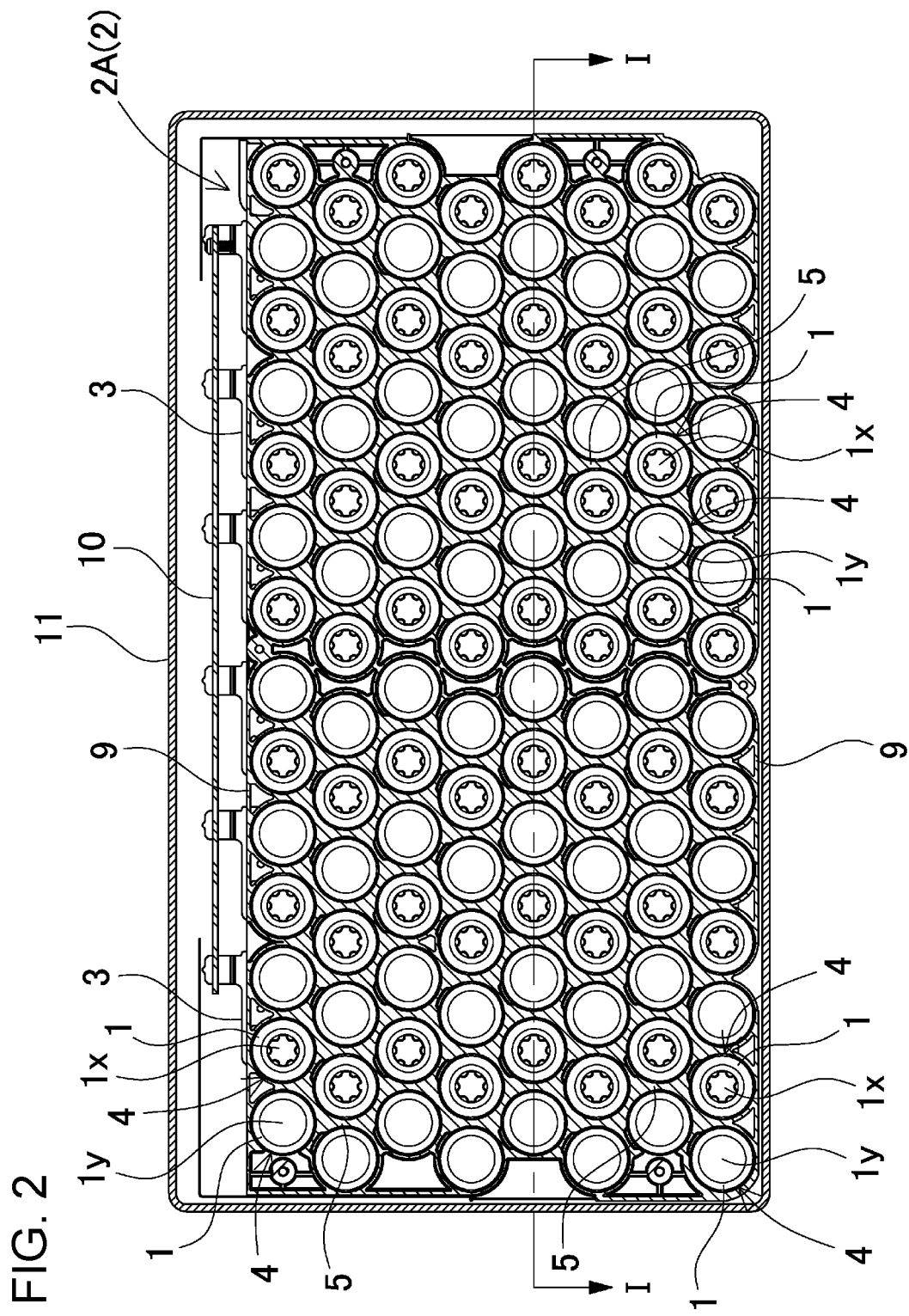
FIG. 2 is a cross-sectional view of the battery pack illustrated in FIG. 1 taken along line II-II.
Figure 3:
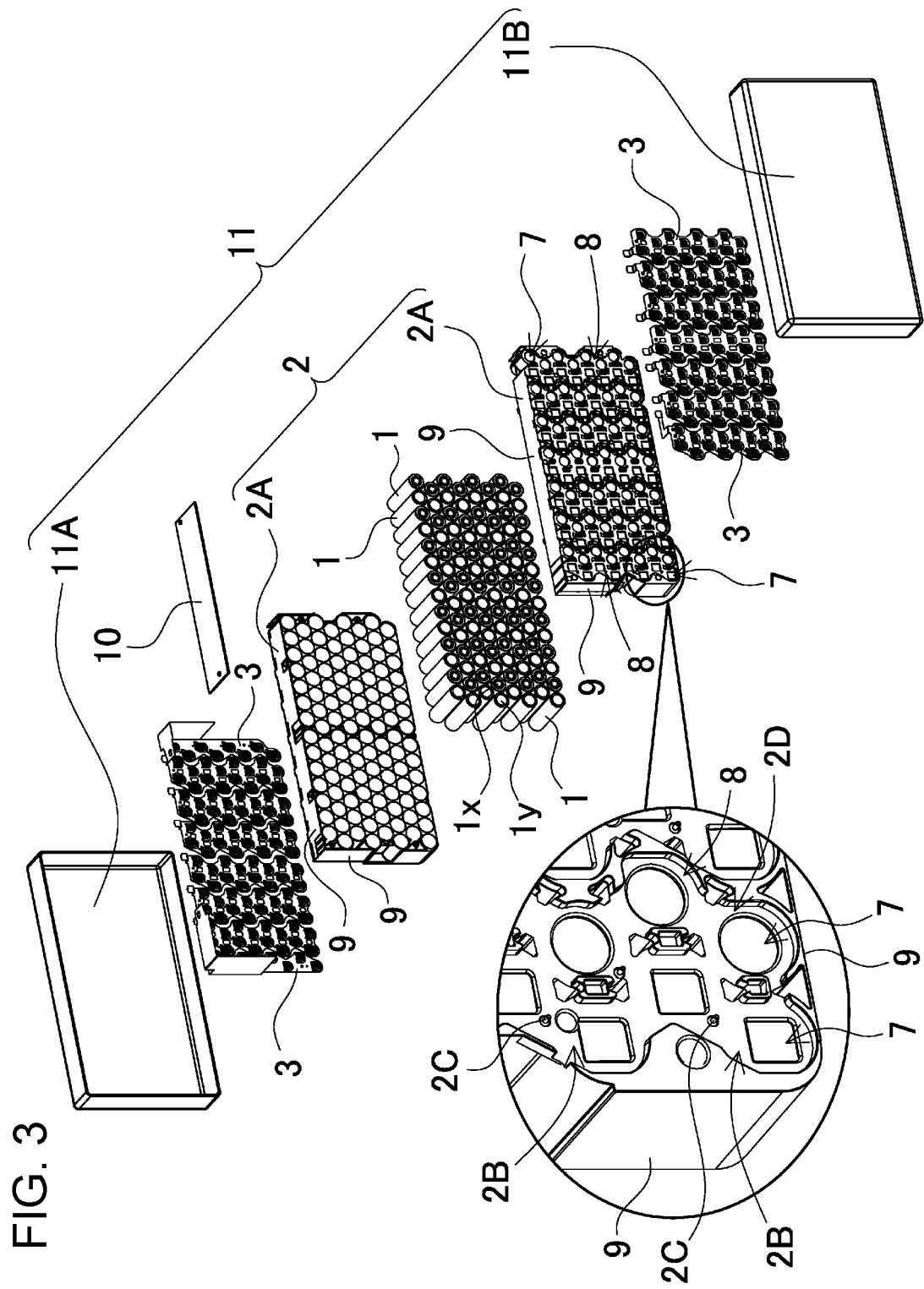
FIG. 3 is a partially-enlarged exploded perspective view of the battery pack illustrated in FIG. 1.
Figure 4:
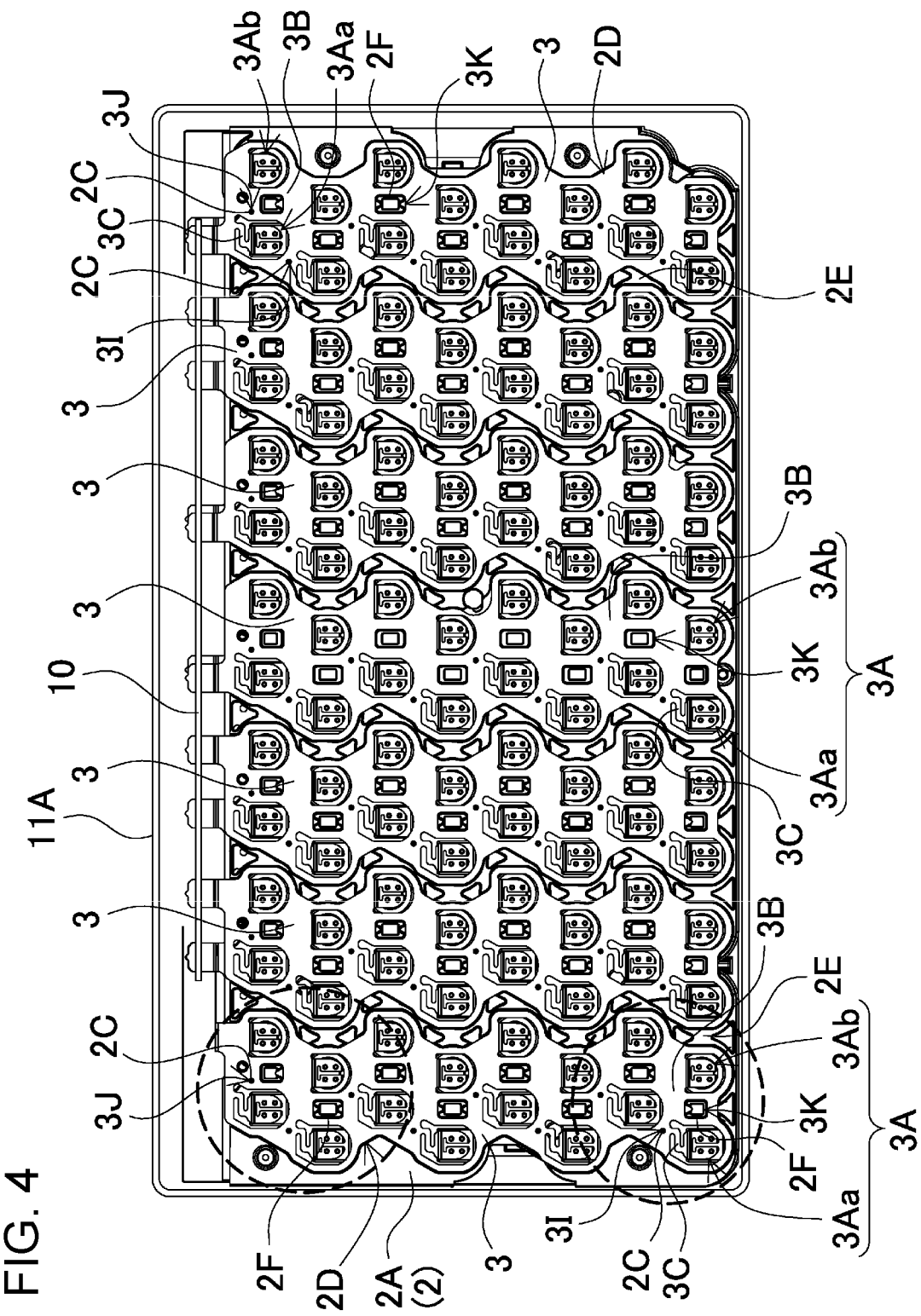
FIG. 4 is a front view that illustrates an internal configuration of the battery pack illustrated in FIG. 1, and illustrates bus bars fixed to a battery holder.
Figure 5:
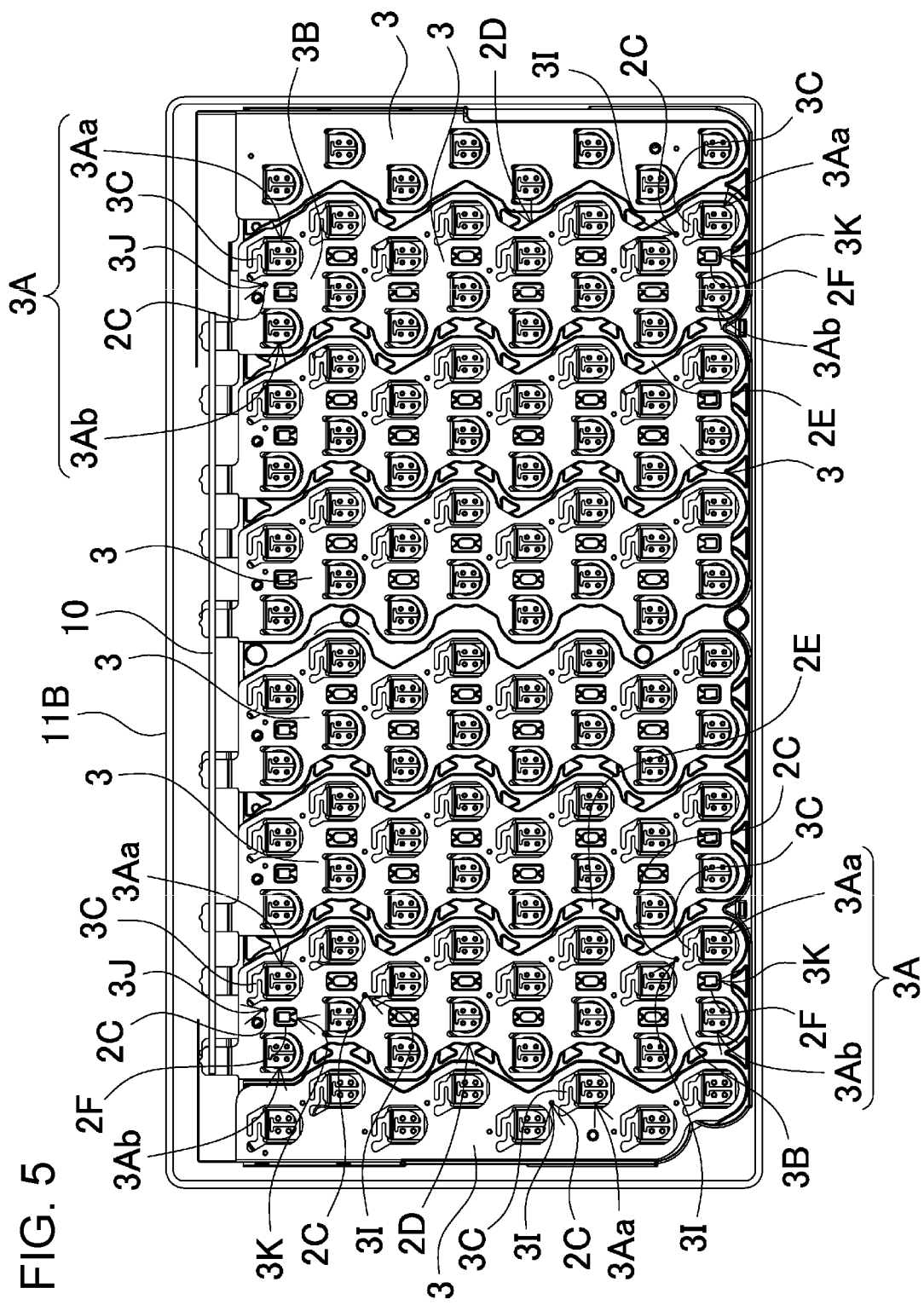
FIG. 5 is a rear view that illustrates the internal configuration of the battery pack illustrated in FIG. 1, and illustrates bus bars fixed to the battery holder.
Figure 6:
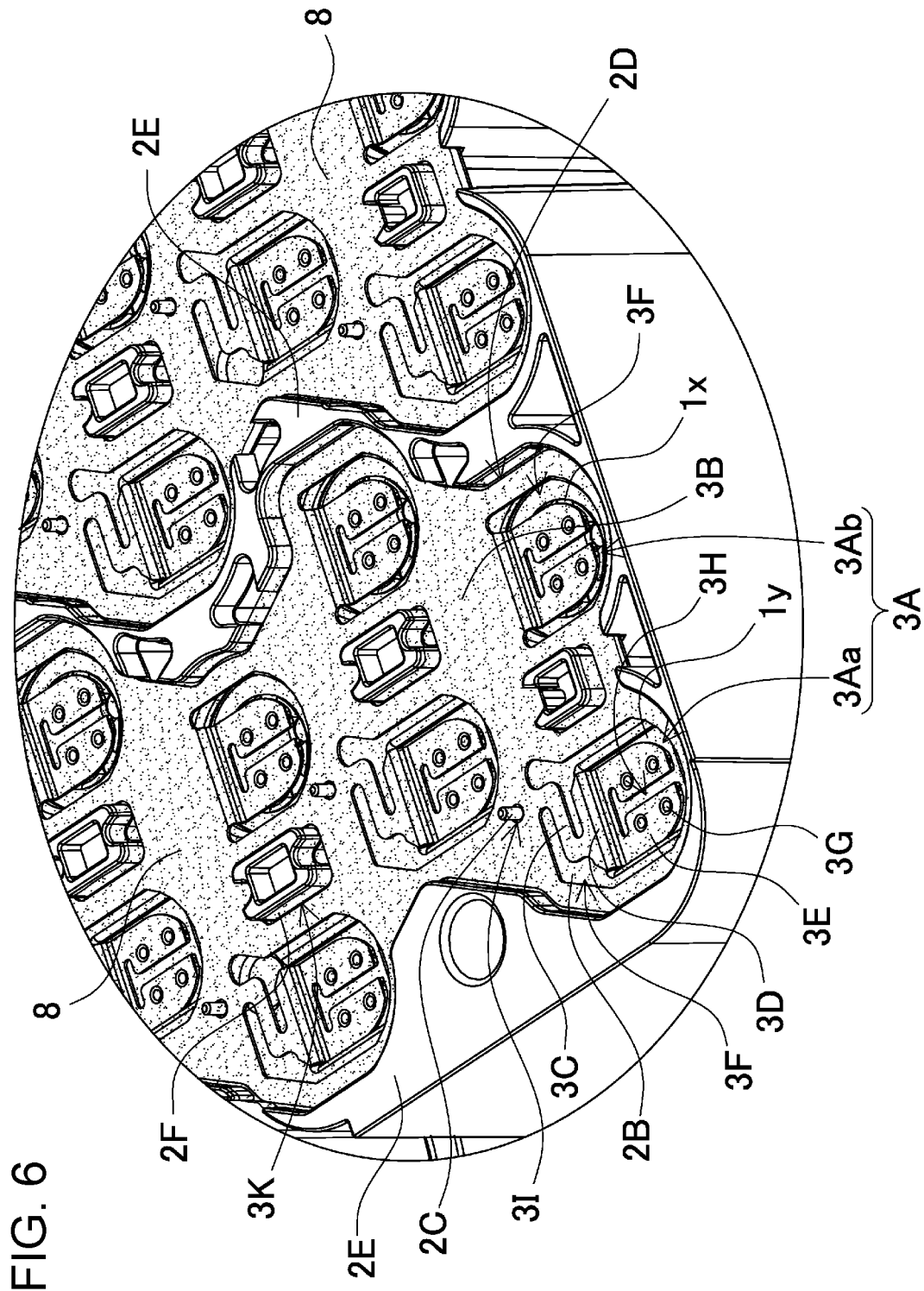
FIG. 6 is an enlarged perspective view that illustrates the internal configuration of the battery pack illustrated in FIG. 1, and illustrates the bus bars covered with a heat insulating member.

FIGS. 1 to 6 illustrate a battery pack according to an exemplary embodiment of the present invention. FIG. 1 illustrates a horizontal cross-sectional view of the battery pack. FIG. 2 illustrates a vertical cross-sectional view of the battery pack. FIG. 3 illustrates an exploded perspective view of the battery pack. FIG. 4 illustrates a front view that illustrates an internal configuration of the battery pack. FIG. 5 illustrates a rear view that illustrates the internal configuration of the battery pack. FIG. 6 illustrates an enlarged perspective view that illustrates the internal configuration of the battery pack. The battery pack illustrated in FIGS. 1 to 6 includes a plurality of batteries 1 that are chargeable and dischargeable, battery holder 2 that arranges the plurality of batteries 1 at predetermined positions, and bus bars 3 that are metal sheets fixed to electrode terminals 1x, 1y of batteries 1. Battery holder 2 puts the plurality of batteries 1 parallel to each other, arranges both ends of the plurality of batteries 1 on same planes, and arranges the plurality of batteries 1 at predetermined positions. The plurality of batteries 1 which battery holder 2 arranges at predetermined positions are connected with each other in series and in parallel by bus bars 3. Each of bus bars 3 includes a plurality of fixed terminals 3A connected with the electrode terminals of batteries 1, base 3B that connects the plurality of batteries 1 with each other through the plurality of fixed terminals 3A in series and/or in parallel, and fuse links 3C that include ends that connect with fixed terminals 3A, respectively, and roots that connect with base 3B. The battery pack also includes heat insulating member 8 that tightly covers surfaces of fuse links 3C, and surfaces of fixed terminals 3A connected with fuse links 3C, respectively, at a close contact state. In FIGS. 2, 4, and 5, heat insulating member 8 is not illustrated to allow a configuration of the battery pack to be easily seen. Further, battery holder 2 that arranges the plurality of batteries 1 at predetermined positions are disposed in external case 11. Consequently, the battery pack is assembled.

(Battery 1)

The battery pack in the drawings includes batteries 1 that are cylindrical batteries. Each of the cylindrical batteries includes an exterior can that is cylindrical, an electrode assembly disposed within the exterior can, electrolyte filled within the exterior can, and a sealing plate that seals an opening of the exterior can. A bottom surface of the exterior can, and a projection electrode at a center of the sealing plate are both end surfaces of the cylindrical battery. The bottom surface of the exterior can and the projection electrode at a center of the sealing plate are positive and negative electrode terminals 1x, 1y. The cylindrical batteries that each include positive and negative electrode terminals 1x, 1y at both the end surfaces of each of the cylindrical batteries are arranged parallel to each other by battery holder 2. Battery holder 2 exposes electrode terminals 1x, 1y at both ends of the cylindrical batteries. Electrode terminals 1x, 1y are connected with each other in series and in parallel by bus bars 3. The battery pack in the drawings includes batteries 1 that are cylindrical batteries. According to an aspect of the present invention, however, batteries are not limited to cylindrical batteries, and may be prismatic (=rectangular) batteries, for example. The batteries are non-aqueous-electrolyte secondary batteries, such as lithium-ion batteries. However, the present invention does not limit batteries to lithium-ion batteries. All secondary batteries that are currently used or will now be developed, such as other non-aqueous-electrolyte secondary batteries or nickel metal hydride batteries may be used.

(Battery Holder 2)

Battery holder 2 is made of resin, such as a thermoplastic resin that is an insulating material. Battery holder 2 is molded into a predetermined shape. Preferably, battery holder 2 may be made of a flame-resistant resin. Polycarbonate (PC) or polypropylene (PP) can be used as such a resin.

As illustrated in FIGS. 1 and 3, the plurality of batteries 1 are inserted into battery accommodating portions 4 of battery holder 2. Battery holder 2 arranges the plurality of batteries 1 at predetermined positions, and thus the plurality of batteries 1 are parallel to each other. When batteries 1 are inserted into battery accommodating portions 4, electrode terminals 1x, 1y at both end surfaces of batteries 1 are arranged on same planes. Consequently, electrode terminals 1x, 1y are exposed from both surfaces of battery holder 2. Partition wall 5 partitions battery holder 2 into battery accommodating portions 4. Partition wall 5 is in contact with and is thermally connected with outer curved surfaces of batteries 1 in a thermal-coupling state. Heat generated in batteries 1 is transferred to partition wall 5 thermally connected with batteries 1. Consequently, partition wall 5 absorbs heat generated in batteries 1. Partition wall 5 that partitions battery holder 2 into battery accommodating portions 4 is between batteries 1 that are adjacent to each other. Surfaces of partition wall 5 are in contact with surfaces of batteries 1. Partition wall 5 is thermally connected with batteries 1. Partition wall 5 is in contact with surfaces of batteries 1, and thus arranges batteries 1 at predetermined positions. Batteries 1 are inserted into battery accommodating portions 4 into which partition wall 5 partitions battery holder 2, and thus are arranged at predetermined positions. Accordingly, inner surfaces of battery accommodating portions 4 each have an inner shape that corresponds to an outer curved surface of battery 1. Battery accommodating portions 4 of battery holder 2 in the drawings each have an inner shape that is cylindrical since the cylindrical batteries are inserted into battery accommodating portions 4, and thus are arranged at predetermined positions. An inner diameter of battery accommodating portions 4 that are cylindrical is slightly larger than an outer diameter of the cylindrical batteries. Battery accommodating portions 4 are thermally connected with the cylindrical batteries. Battery accommodating portions 4 arrange cylindrical batteries at predetermined positions. A surface of partition wall 5 between batteries 1 has a shape that corresponds to a surface of the cylindrical battery since partition wall 5 partitions battery holder 2 into battery accommodating portions 4.

Battery holder 2 illustrated in FIGS. 2 and 3 has a shape in which the plurality of battery accommodating portions 4 are arranged in a "staggered (=zigzag) arrangement" in a plurality of columns and a plurality of rows. The plurality of battery accommodating portions 4 are parallel to each other. Battery holder 2 includes partition wall 5 between the batteries, and peripheral wall 9 that surrounds battery holder 2. Partition wall 5 and peripheral wall 9 are integrally molded. Battery holder 2 includes battery accommodating portions 4 arranged between peripheral wall 9 and partition wall 5 at a peripheral portion of the battery holder 2, and battery accommodating portions 4 arranged between partition walls 5 inside battery holder 2. Partition wall 5 and peripheral wall 9 have battery contact surfaces that each have a shape that corresponds to a surface of battery 1. Partition wall 5 and peripheral wall 9 are thermally connected with batteries 1, and arrange batteries 1 at predetermined positions.

Battery holder 2 in FIGS. 2 and 3 arranges battery accommodating portions 4 in a staggered (=zigzag) arrangement. Battery holder 2 arranges batteries 1 in such a manner that a space is used efficiently. Therefore, whole battery holder 2 is compact. Resin at valley portions is reduced. Consequently, an amount of used resin is reduced, and thus manufacturing cost is reduced, and a weight is reduced. Instead of an arrangement of batteries in a plurality of rows and a plurality of columns, battery holder 2 may vertically and laterally arrange batteries, and batteries may be arranged at intersections of a grid.

Battery holder 2 in FIGS. 2 and 3 arranges 112 batteries 1 in eight rows and fourteen columns. In FIGS. 2 and 3, one column of batteries 1 vertically arranged are in a staggered (=zigzag) arrangement. An adjacent column of batteries 1 are arranged at valley portions of the staggered (=zigzag) arrangement. Batteries 1 are arranged in a staggered (=zigzag) arrangement. Battery holder 2 includes partition wall 5 between batteries 1 that are arranged in a plurality of rows and a plurality of columns. In other words, partition wall 5 forms battery accommodating portions 4. Batteries 1 are arranged between partition walls 5. Heat of batteries 1 is transferred to partition wall 5.

Battery holder 2 illustrated in FIGS. 1 and 3 is divided into halves, and includes a pair of holder units 2A. Holder units 2A are open at electrode windows 7. Electrode windows 7 are at both ends of battery accommodating portions 4 that hold batteries 1 that have been inserted into battery accommodating portions 4. Electrode windows 7 expose electrode terminals 1x, 1y at both ends of batteries 1. Bus bars 3 are connected with electrode terminals 1x, 1y of batteries 1 which electrode windows 7 expose. In battery holder 2 in FIG. 2, electrode windows 7 that expose electrode terminals 1y of batteries 1 each have a square shape. Electrode windows 7 that expose other electrode terminals 1x of batteries 1 each have a circular shape. Electrode windows 7 are smaller than an outer shape of batteries 1, and thus batteries 1 do not pass through electrode windows 7, and batteries 1 are arranged in battery accommodating portions 4.

Battery holder 2 illustrated in FIGS. 3 and 6 is molded, and thus includes positioning hollows 2D at both surfaces of battery holder 2. Each of positioning hollows 2D arranges bus bars 3 at predetermined positions. Battery holder 2 in FIGS. 3 and 6 includes the plurality of positioning hollows 2D that arrange the plurality of bus bars 3 at predetermined positions. Positioning hollows 2D each have a shape that corresponds to a periphery of bus bars 3. Therefore, bus bars 3 are inserted into positioning hollows 2D while bus bars 3 are positioned. Battery holder 2 in FIGS. 3 and 6 includes boundary walls 2E at both surfaces of battery holder 2. Boundary walls 2E correspond to a periphery of bus bars 3. Areas within boundary walls 2E are positioning hollows 2D. Bottom surfaces of positioning hollows 2D of battery holder 2 are lower than an end surface of battery holder 2, more specifically, an end surface of boundary walls 2E. Bottom surfaces of positioning hollows 2D are open at the plurality of electrode windows 7. The plurality of bus bars 3 are arranged on a same plane at the bottom surfaces. Bus bars 3 are arranged in positioning hollows 2D formed at both surfaces of battery holder 2, and bus bars 3 are connected with batteries 1. Then heat insulating member 8 is disposed in positioning hollows 2D.

A length of battery accommodating portions 4 formed by the pair of holder units 2A of battery holder 2, that is, a thickness of one of holder units 2A, is substantially same as a half of a total length of batteries 1. Holder units 2A that are in connect with each other form battery accommodating portions 4. Batteries 1 are inserted into battery accommodating portions 4. Consequently, battery accommodating portions 4 cover whole outer curved surfaces of batteries 1. Battery accommodating portions 4 that cover whole outer curved surfaces of batteries 1 effectively do not allow fire to spread from a battery to an adjacent battery.

(Bus Bar 3)

The plurality of batteries 1 arranged in a plurality of rows and a plurality of columns are connected with each other in series and in parallel by bus bars 3 of the battery pack illustrated in FIGS. 1 and 5. Each of bus bars 3 is a conductive metal sheet, and includes a plurality of fixed terminals 3A connected with electrode terminals 1x, 1y of batteries 1, base 3B that connects the plurality of batteries 1 with each other through fixed terminals 3A in series and in parallel, and fuse links 3C that include ends that connect with fixed terminals 3A, respectively, and roots that connect with base 3B. Each of bus bars 3 is made by cutting one metal sheet with a die, and bending the one metal sheet that has been cut. FIG. 4 is a front view of bus bar 3 arranged on a front-side surface of battery holder 2. FIG. 5 is a front view of bus bar 3 arranged on a rear side surface of battery holder 2. Seven bus bars 3 are arranged on the front-side surface of battery holder 2. Eight bus bars 3 are arranged on the rear-side surface of battery holder 2. Bus bars 3 connect batteries 1 with each other in parallel and in series.

As illustrated in FIGS. 6 to 9, fixed terminals 3A are connected with electrode terminals 1x, 1y of batteries 1 by spot welding. Each of fixed terminals 3A includes welded portion 3E at an end of step 3D. Gap 3F is between fixed terminal 3A and base 3B. Consequently, welded portion 3E is apart from base 3B. Welded portion 3E is disposed within electrode window 7 of battery holder 2, and is connected with electrode terminals 1x, 1y of battery 1 by spot welding. Welded portion 3E that is separate from base 3B projects from step 3D to electrode terminals 1x, 1y. Welded portion 3E is in contact with and is connected with electrode terminals 1x, 1y within electrode window 7. Welded portion 3E that projects from step 3D to electrode terminals 1x, 1y is inserted into electrode window 7 of battery holder 2, and becomes in contact with electrode terminals 1x, 1y arranged on an inner surface of electrode window 7. Projections 3G partially project from welded portion 3E to electrode terminals 1x, 1y. Two projections 3G are on both sides of slit 3H. Projections 3G are connected with electrode terminals 1x, 1y by spot welding. Slit 3H reduces reactive (or invalid) current. Consequently, projections 3G are efficiently welded to electrode terminals 1x, 1y.

Fixed terminals 3A include first fixed terminals 3Aa that are connected with base 3B through fuse links 3C, respectively. Fixed terminals 3A also include second fixed terminals 3Ab that are directly connected with base 3B not through fuse links, respectively. For each of first fixed terminals 3Aa, fuse link 3C connects step 3D with base 3B. For each of second fixed terminals 3Ab, step 3D is directly connected with base 3B. In the battery pack in the drawings, fuse link 3C is connected with electrode terminal 1y on a negative side of battery 1. Therefore, first fixed terminal 3Aa is connected with the negative side of battery 1. Second fixed terminal 3Ab is connected with electrode terminal 1x on a positive side of battery 1.

Fuse link 3C is at a position opposite supporting surface 2B of battery holder 2. That is, battery holder 2 includes supporting surface 2B at a surface opposite fuse link 3C. Fuse link 3C is in contact with supporting surface 2B of battery holder 2 or is at a position near supporting surface 2B of battery holder 2. Therefore, supporting surface 2B does not allow fuse link 3C to be deformed or damaged. A height of step 3D is set to a height that allows fuse link 3C to be in contact with or to be near supporting surface 2B. That is, the height of step 3D is set to a height that allows fuse link 3C to be in contact with or is near supporting surface 2B after welded portion 3E is fixed to electrode terminals 1x, 1y. Bus bar 3 allows welded portions 3E to be fixed to electrode terminals 1x, 1y, and allows fuse links 3C to be in contact with or is near supporting surfaces 2B. In battery holder 2 in FIG. 3, fixed terminals 3A connected with fuse links 3C, respectively, are arranged within electrode windows 7 that each have a square shape. Supporting surfaces 2B for fuse links 3C are outside edges of openings of electrode windows 7, respectively. Battery holder 2 includes electrode windows 7 that each have a square shape, and supporting surfaces 2B that are outside electrode windows 7, respectively. Therefore, whole surfaces of fuse links 3C are opposite supporting surfaces 2B, respectively. Therefore, battery holder 2 surely does not allow all fuse links 3C to be deformed and damaged.

Figure 7:
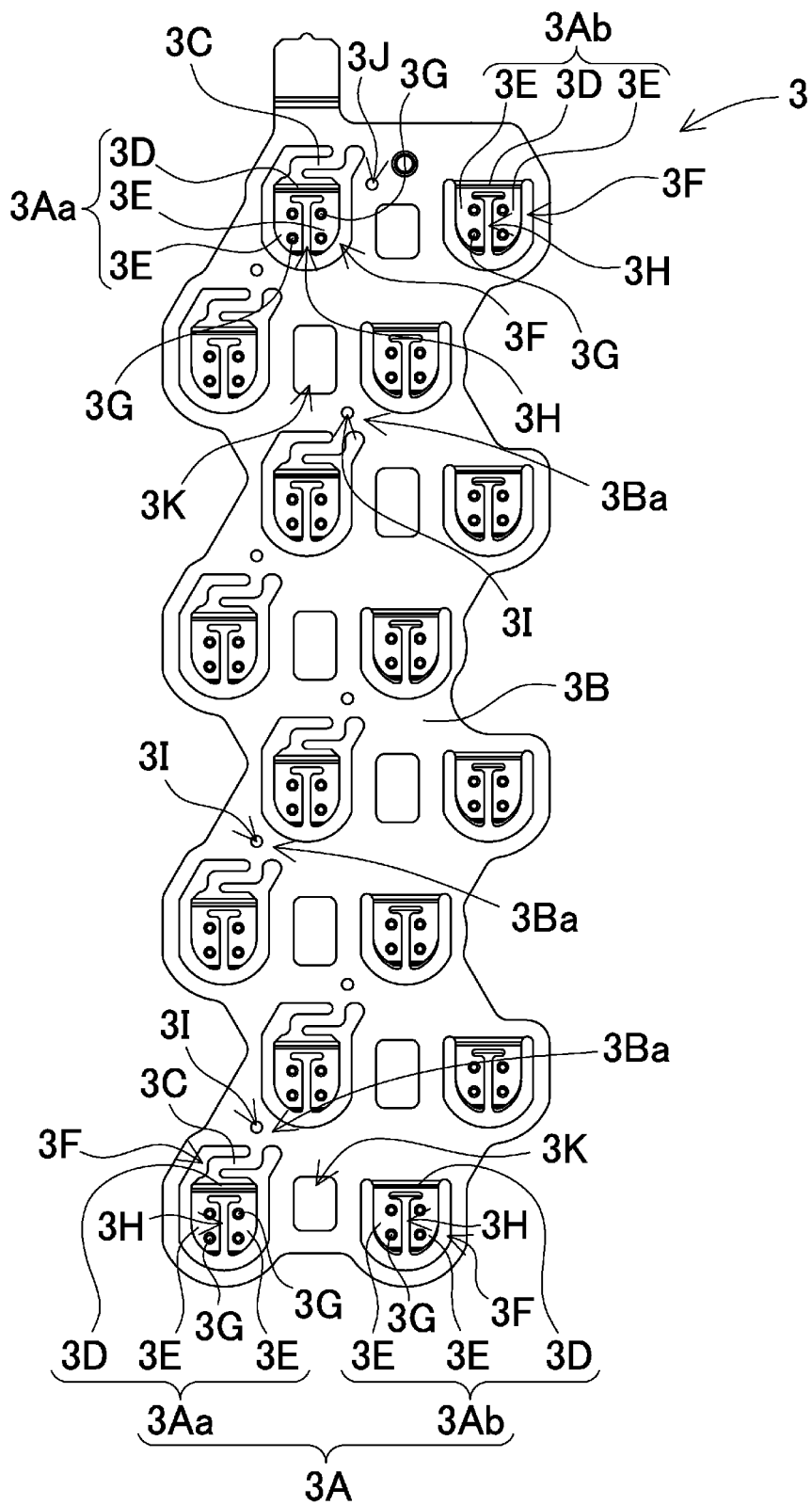
FIG. 7 is a front view of one of the bus bars.

Base 3B is part of bus bar 3 that does not include fixed terminals 3A and fuse links 3C. All batteries 1 connected with fixed terminals 3A are connected with each other in parallel and in series by base 3B. One metal sheet is pressed. The pressed metal sheet is cut to form a plurality of fixed terminals 3A and fuse links 3C within the metal sheet that has been pressed. The metal sheet that has been cut is bent. Consequently, as illustrated in FIG. 7, bus bar 3 includes base 3B outside fixed terminals 3A, and between fixed terminals 3A that are adjacent to each other. Bus bar 3 includes fuse-link connecting portions 3Ba. Each of fuse-link connecting portions 3Ba is part of base 3B that is between fixed terminals 3A that are adjacent to each other, and is connected with a root of fuse link 3C.

As illustrated in FIGS. 6 to 9, each of fuse-link connecting portions 3Ba includes first fitting portion 3I connected with battery holder 2 not to allow fuse-link connecting portions 3Ba and battery holder 2 to move relative to each other. First fitting portions 3I are connected with second fitting portions 2C of battery holder 2, respectively. Second fitting portions 2C are connected with first fitting portions 3I, respectively. Consequently, fuse-link connecting portions 3Ba are connected with battery holder 2 not to allow fuse-link connecting portions 3Ba and battery holder 2 to move relative to each other. Since fuse-link connecting portions 3Ba and battery holder 2 do not move relative to each other, batteries 1 and fuse links 3C do not move relative to each other. The reason is that since batteries 1 are arranged at predetermined positions of battery holder 2, and fuse links 3C are connected with fuse-link connecting portions 3Ba, fuse links 3C are connected with batteries 1 through battery holder 2 in such a manner that fuse links 3C and batteries 1 do no move relative to each other. Since batteries 1 and fuse links 3C do not move relative to each other, fuse links 3C do not deform even if the battery pack receives an impact or vibration. Therefore, fuse links 3C do not break even if the battery pack receives an impact, for example the battery pack falls.

Figure 8:
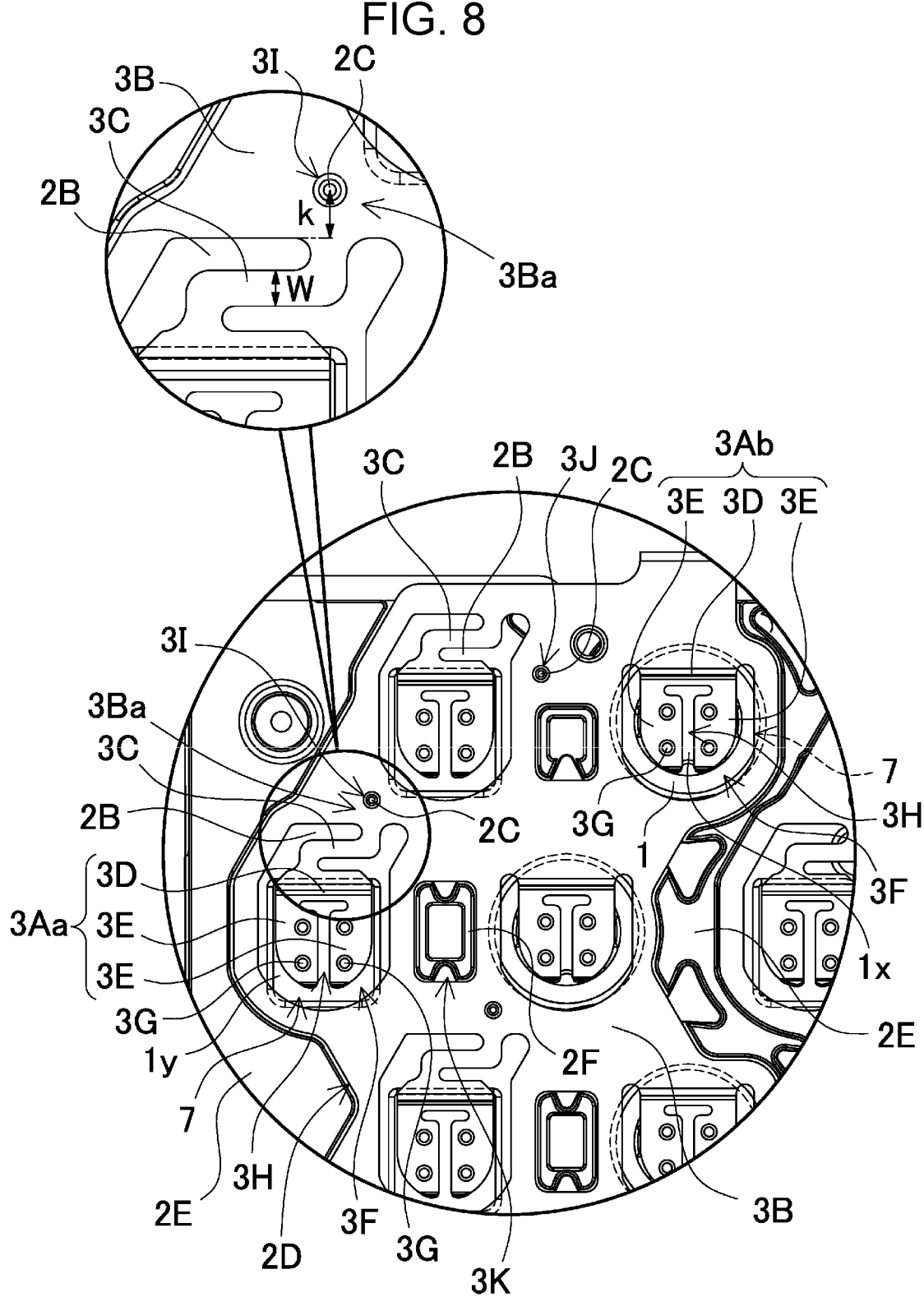
FIG. 8 is a partially-enlarged front view of an upper left portion of the battery pack illustrated in FIG. 5.
Figure 9:
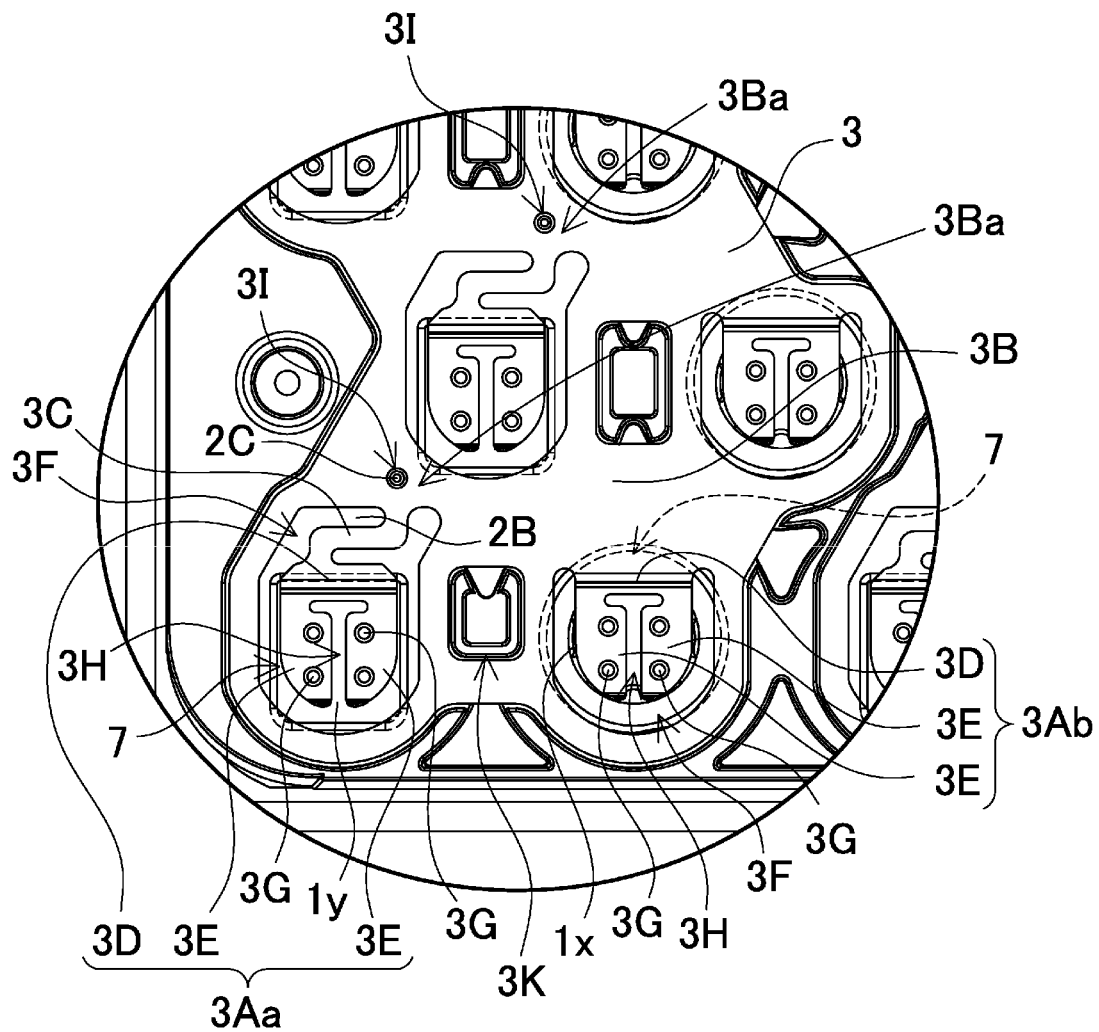
FIG. 9 is an enlarged front view of a lower left portion of the battery pack illustrated in FIG. 5.

Bus bar 3 in FIGS. 8 and 9 includes fitting holes as first fitting portions 3I, and connecting ribs as second fitting portions 2C that are molded on battery holder 2. The fitting holes are formed by cutting bus bar 3. The connecting ribs are molded integrally with battery holder 2. An outer shape of each of the connecting ribs is substantially same as an inner shape of each of the fitting holes. However, the connecting ribs each have a size that allows the connecting ribs to be inserted into the fitting holes. Bus bar 3 in FIGS. 8 and 9 includes the fitting holes that are circular. The connecting ribs each have a cylindrical shape. Therefore, an inner diameter of the fitting holes is slightly larger than an outer diameter of the connecting ribs. The connecting ribs are inserted into the fitting holes during assembly. Consequently, fuse-link connecting portions 3Ba are connected with battery holder 2 in such a manner that fuse-link connecting portions 3Ba and battery holder 2 do not move relative to each other. Consequently, fuse links 3C and batteries 1 do not move relative to each other. Therefore, the structure surely does not allow fuse links 3C to be deformed. The structure allows easy assembly. To make bus bar 3, a metal sheet is cut, and fitting holes are formed. Further, in a process that molds battery holder 2, connecting ribs are molded integrally with battery holder 2. Therefore, a manufacturing process is easy. Alternatively, according to an aspect of the present invention, fitting projections may be first fitting portions 3I, and fitting hollows or fitting holes into which the fitting projections are fitted may be second fitting portions 2C. The fitting projections and the fitting hollows or the fitting holes are not illustrated.

In bus bar 3 in FIGS. 6 to 9, first fitting portions 3I are near roots of fuse links 3C. In bus bar 3, distance (k) between first fitting portion 3I and a root of fuse link 3C is shorter than or equal to five times width (W) of fuse link 3C. Therefore, deformation of fuse link 3C is further reduced. In bus bar 3 in FIGS. 6 to 9, first fitting portion 3I of fuse-link connecting portion 3Ba is on an extended line of a root of fuse link 3C. Consequently, first fitting portion 3I is near the root of fuse link 3C. First fitting portions 3I and second fitting portions 2C surely do not allow fuse links 3C to be deformed. Therefore, the structure effectively does not allow deformation or damage.

The bus bar does not necessarily need the first fitting portions at all the fuse-link connecting portions. In bus bar 3 in FIGS. 7 to 9, first fitting portions 3I are only at fuse-link connecting portions 3Ba each between fixed terminals 3A that are adjacent to each other. First fitting portions are not at fuse-link connecting portions 3Ba at a periphery of bus bar 3. Through hole 3J is formed through base 3B near fuse-link connecting portion 3Ba at the periphery. Connecting rib of battery holder 2 is inserted into through hole 3J. Through hole 3J and the connecting rib do not allow relative movement. Consequently, fuse link 3C is not allowed to deform.

In FIGS. 7 to 9, bus bar 3 includes positioning holes 3K at base 3B. Each of positioning holes 3K is between fixed terminals 3A that are transversely arranged. Positioning ribs 2F are inserted into positioning holes 3K. Consequently, bus bar 3 is disposed at a predetermined position of battery holder 2. Positioning ribs 2F are molded integrally with battery holder 2. Positioning holes 3K and positioning ribs 2F position bus bar 3 at a predetermined position on battery holder 2. Further, positioning holes 3K and positioning ribs 2F do not allow bus bar 3 and battery holder 2 to move relative to each other.

Each of bus bars 3 arranged on a front surface of battery holder 2 connects batteries 1 with each other in parallel that are vertically arranged in FIGS. 4 and 5, and connects batteries 1 with each other in series that are horizontally apart from each other and are transversely adjacent to each other. Bus bars 3 arranged on a rear-side surface of battery holder 2 include bus bars 3 that each connect batteries 1 with each other in parallel that are arranged on either side in FIG. 5 and are arranged vertically in a line. Bus bars 3 arranged on a rear-side surface of battery holder 2 also include bus bars 3 that each connect two columns of batteries 1 with each other in parallel and in series. Bus bars 3 that each connect two columns of batteries 1 with each other in parallel and in series each connect batteries 1 in each column with each other in parallel, and each connect batteries 1 of an adjacent column with each other in series, similarly as bus bars 3 on a front surface of battery holder 2.

Figure 10:
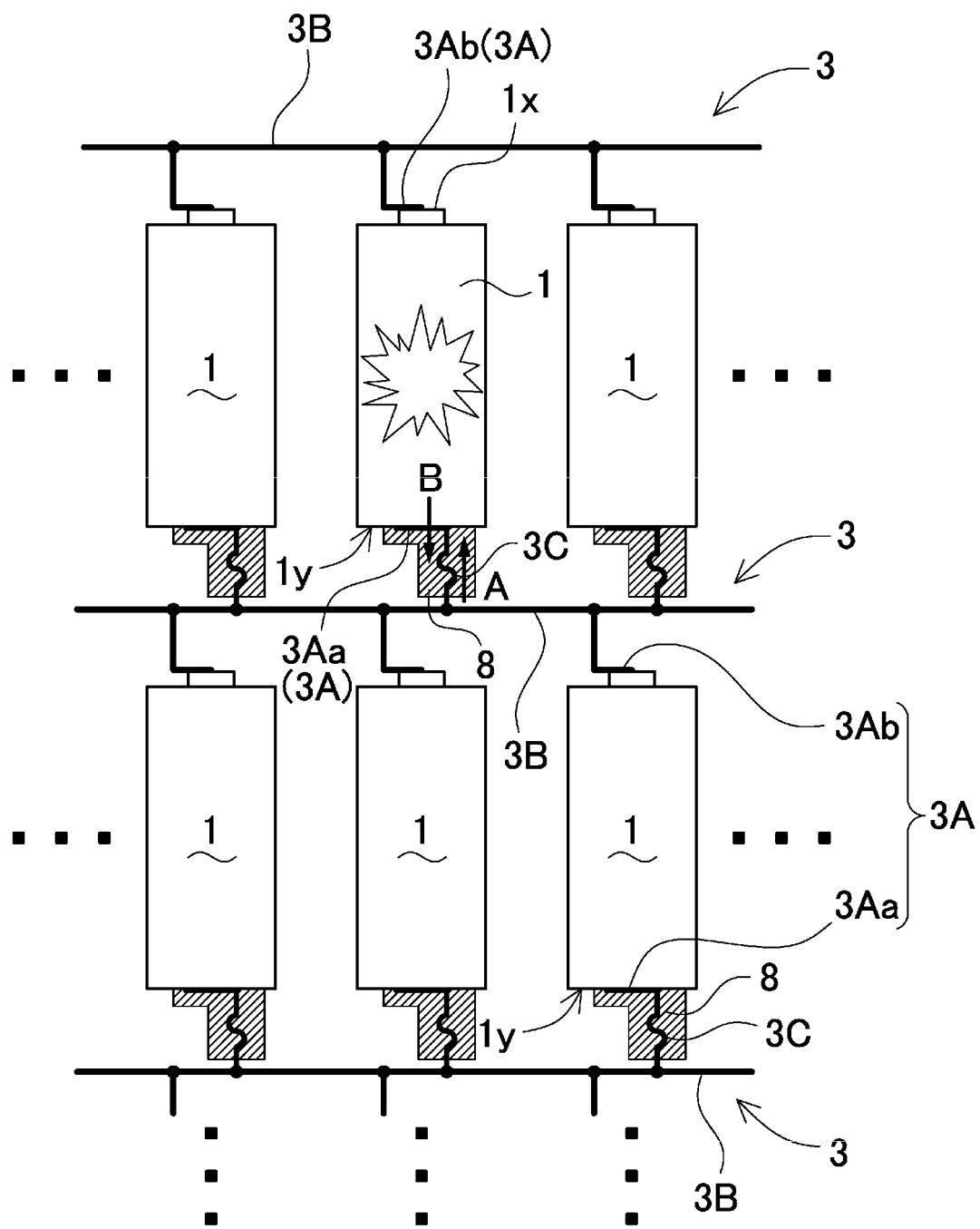
FIG. 10 is a schematic circuit diagram in which batteries of the battery pack illustrated in FIG. 1 are connected with each other.

Bus bar 3 connects first fixed terminals 3Aa with electrode terminals 1y of batteries 1 through fuse links 3C, respectively. FIG. 10 illustrates a schematic circuit diagram of a circuit that connects the plurality of batteries 1 with each other in parallel and in series. In the battery pack that has a circuit configuration in the circuit diagram, fuse links 3C are connected with negative sides of batteries 1, respectively. Fixed terminals 3A of bus bars 3 are connected with positive sides and negative sides of batteries 1. Fuse links 3C are connected with first fixed terminals 3Aa, respectively, that are connected with the negative sides. Therefore, fuse links 3C are connected with a half of first fixed terminals 3Aa, respectively, that are connected with the negative sides.

Fixed terminals 3A of bus bars 3 are connected with electrode terminals 1x, 1y of batteries 1 by spot welding or laser welding. In FIGS. 4 and 5, batteries 1 arranged in a plurality of rows (vertically arranged in FIGS. 4 and 5) are connected with each other in parallel by bus bars 3. Further, batteries 1 arranged in a plurality of columns (transversely arranged in FIGS. 4 and 5) are connected with each other in series by bus bars 3. However, the bus bars may connect batteries with each other in series that are arranged in a plurality of rows, and may connect batteries with each other in parallel that are arranged in a plurality of columns. Bus bars 3 are arranged on both surfaces of battery holder 2, and connect batteries 1 with each other in series and in parallel.

(Heat Insulating Member 8)

Heat insulating member 8 is disposed on a surface of bus bars 3 connected with electrode terminals 1x, 1y of batteries 1. Heat insulating member 8 tightly covers at least surfaces of fuse links 3C and surfaces of fixed terminals 3A connected with fuse links 3C, respectively, at a close contact state. Heat insulating member 8 is a member that has an insulating property. Preferably, heat insulating member 8 is made of resin. Heat insulating member 8 made of resin is tightly in contact with surfaces of fuse links 3C and surfaces of fixed terminals 3A, and thus insulates fuse links 3C and fixed terminals 3A from outside. Fuse links 3C and fixed terminals 3A that are insulated by heat insulating member 8 effectively transfer heat generated by batteries 1. When an overcurrent flows through fuse links 3C, heat generated by fuse links 3C is not released to outside, and thus surely increases a temperature, and melts fuse links 3C.

Preferably, heat insulating member 8 is made of a potting resin. The potting resin that has not cured is paste or liquid. Surfaces of fuse links 3C of bus bars 3 and surfaces of fixed terminals 3A connected with fuse links 3C, respectively, are filled with potting resin that has not cured. The potting resin with which the surfaces of fuse links 3C and the surfaces of fixed terminals 3A are filled cures as time passes. Consequently, heat insulating member 8 is formed and is tightly fixed to the surfaces of fuse links 3C and the surfaces of fixed terminals 3A.

An adhesive resin, such as a urethane resin, is used as the potting resin. A two-part urethane resin may be used as such a potting resin. Main agent that is liquid at normal temperatures and hardener are stirred and mixed to polymerize the main agent and the hardener. Consequently, the two-part urethane resin that has not cured and has been paste or liquid cures.

However, an epoxy resin or an unsaturated polyester resin may be used as the two-part resin. Resin that has been paste or liquid at normal temperatures and cures as times passes may be used as the potting resin. Alternatively, resin that has been paste or liquid at normal temperatures and is cured by heat or light (thermosetting resin, light-activated resin) may be used as the potting resin. The potting resin that has not cured is filled on surfaces of fuse links 3C and surfaces of fixed terminals 3A, and cures as time passes. The potting resin that has cured is tightly fixed to the surfaces of fuse links 3C and the surfaces of fixed terminals 3A and has excellent heat insulation.

Heat insulating member 8 is formed to cover surfaces of the plurality of fuse links 3C of bus bars 3, and surfaces of fixed terminals 3A connected with fuse links 3C, respectively. Heat insulating member 8 illustrated in FIG. 6 is formed to cover whole surfaces of bus bars 3. As described before, potting resin that has not cured and is paste or liquid is filled into positioning hollows 2D. In other words, while positioning hollows 2D are used as mold containers for heat insulating member 8, potting resin that has not cured is filled into positioning hollows 2D. The potting resin that has been filled is cured. Consequently, heat insulating member 8 that covers whole surfaces of bus bars 3 is formed. According to the method, bus bars 3 are fixed to bottom surfaces of positioning hollows 2D of battery holder 2. Then battery holder 2 is disposed in such a manner that openings of positioning hollows 2D face upward. Then the potting resin that has not cured is filled into positioning hollows 2D. The potting resin that has not cured and is filled into positioning hollows 2D spreads over surfaces of bus bars 3, and covers whole surfaces of bus bars 3. Potting resin that is filled into positioning hollows 2D is cured. Consequently, heat insulating member 8 covers whole surfaces of bus bars 3.

As described before, the plurality of fuse links 3C and the plurality of fixed terminals 3A of bus bars 3 are easily covered with heat insulating member 8 formed on whole surfaces of bus bars 3. Further, as described before, the potting resin is filled into positioning hollows 2D to form heat insulating member 8. Consequently, heat insulating member 8 that has a predetermined thickness is formed on surfaces of bus bars 3. Consequently, portions of heat insulating member 8 that cover the plurality of fuse links 3C and the plurality of fixed terminals 3A have a same thickness. Consequently, a time it takes for fuse links 3C to melt is constant. Consequently, fuse links 3C surely melt when an assigned electric current flows through fuse links 3C.

The potting resin filled to cover surfaces of fuse links 3C and surfaces of fixed terminals 3A enters hollows each formed between electrode window 7 and electrode terminals 1x, 1y, and gaps 3F each formed between fixed terminal 3A and base 3B, and gaps 3F each formed between fuse link 3C and base 3B. Consequently, the potting resin is tightly filled into surfaces of fuse links 3C and surfaces of fixed terminals 3A and into areas near fuse links 3C and fixed terminals 3A, without spaces. Therefore, heat insulating member 8 covers and insulates surfaces of electrode terminals 1x, 1y of batteries 1, or areas around fuse links 3C and fixed terminals 3A. Therefore, heat energy generated within a battery that is in an abnormal state is not released to outside, but is transferred to fuse links 3C through fixed terminals 3A. Consequently, fuse links 3C are effectively heated.

Further, the potting resin filled into positioning hollows 2D fixes connections between first fitting portions 3I and second fitting portions 2C. Heat insulating member 8 covers the connections between first fitting portions 3I and second fitting portions 2C. Therefore, heat insulating member 8 fixes both battery holder 2 and fuse-link connecting portions 3Ba at predetermined positions. Consequently, fuse links 3C and batteries 1 surely do not move relative to each other. Further, the potting resin filled into positioning hollows 2D fixes connections between positioning holes 3K and positioning ribs 2F. Heat insulating member 8 covers the connections between positioning holes 3K and positioning ribs 2F. Therefore, bus bars 3 are stably fixed to predetermined positions on battery holder 2.

Heat insulating member 8 described before covers whole surfaces of bus bars 3. However, the heat insulating member does not necessarily cover whole surfaces of the bus bars. Heat insulating member 8 covers, at least, surfaces of fuse links 3C of bus bars 3 and surfaces of fixed terminals 3A connected with fuse links 3C. Therefore, a heat insulating member (not shown in the figures) may be formed to separately cover surfaces of the plurality of fuse links and surfaces of the fixed terminals connected with the fuse links, respectively. According to the configuration, the potting resin is separately supplied to each of the fuse links and the fixed terminals, and the heat insulating member is formed on each of the fuse links and the fixed terminals. Therefore, an amount of used potting resin is minimized. Consequently, an amount of used potting resin is reduced.

Further, a heat insulating member (not shown in the figures) may be integrally molded to cover surfaces of a plurality of fuse links of bus bars. For example, the potting resin is continuously supplied along surfaces of the bus bars. Consequently, the heat insulating member covers surfaces of all the fuse links of the bus bars. The structure reduces a time for which a heat insulating member is manufactured, and allows the heat insulating member to uniformly cover the fuse links since the heat insulating member that covers surfaces of the plurality of fuse links of bus bars is integrally molded.

(Cover 8A)

Figure 11:
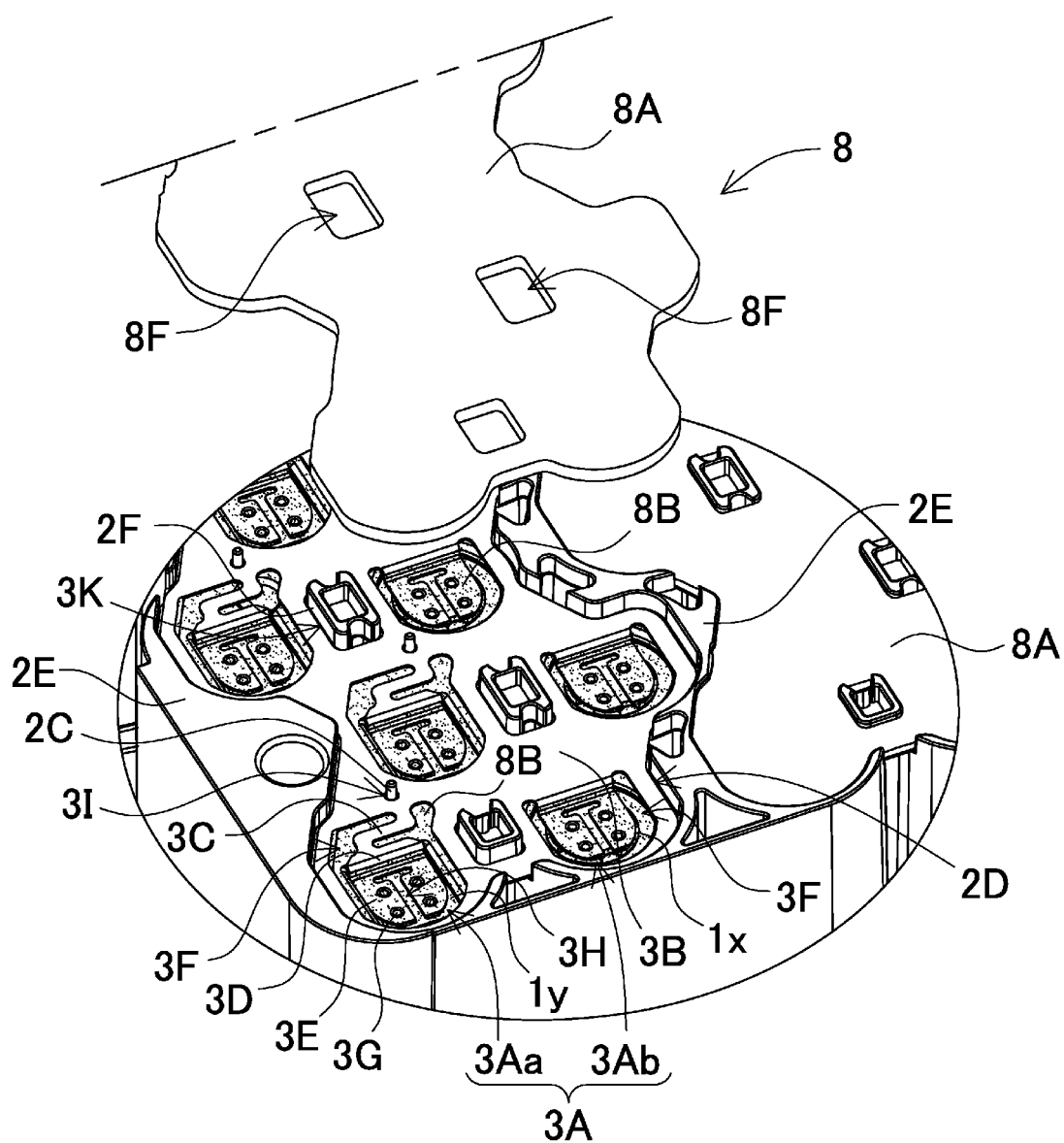
FIG. 11 is an enlarged perspective view that illustrates an internal configuration of a battery pack according to another exemplary embodiment of the present invention.

Heat insulating member 8 may include covers 8A, as illustrated in FIG. 11. Resin is molded into covers 8A. Covers 8A are plates or sheets into which resin is molded. For example, covers 8A are fixed to surfaces of bus bars 3 with adhesive 8B, particularly surfaces of fuse links 3C and surfaces of fixed terminals 3A. Adhesive 8B is filled into projections and hollows formed around fuse links 3C and fixed terminals 3A. Consequently, heat insulating member 8 that is illustrated in FIG. 11 and includes covers 8A and adhesive 8B is tightly fixed to surfaces of the fuse links and surfaces of the fixed terminals. Covers 8A are plates or sheets, and each have a shape that corresponds to an outer shape of bus bars 3, as illustrated in FIG. 11. Therefore, covers 8A are inserted into positioning hollows 2D, respectively, and each disposed along a surface of bus bar 3 and disposed at a predetermined position. Each of covers 8A illustrated in FIG. 11 is open at connection holes 8F. Connection holes 8F are at positions opposite positioning ribs 2F.

Figure 12:
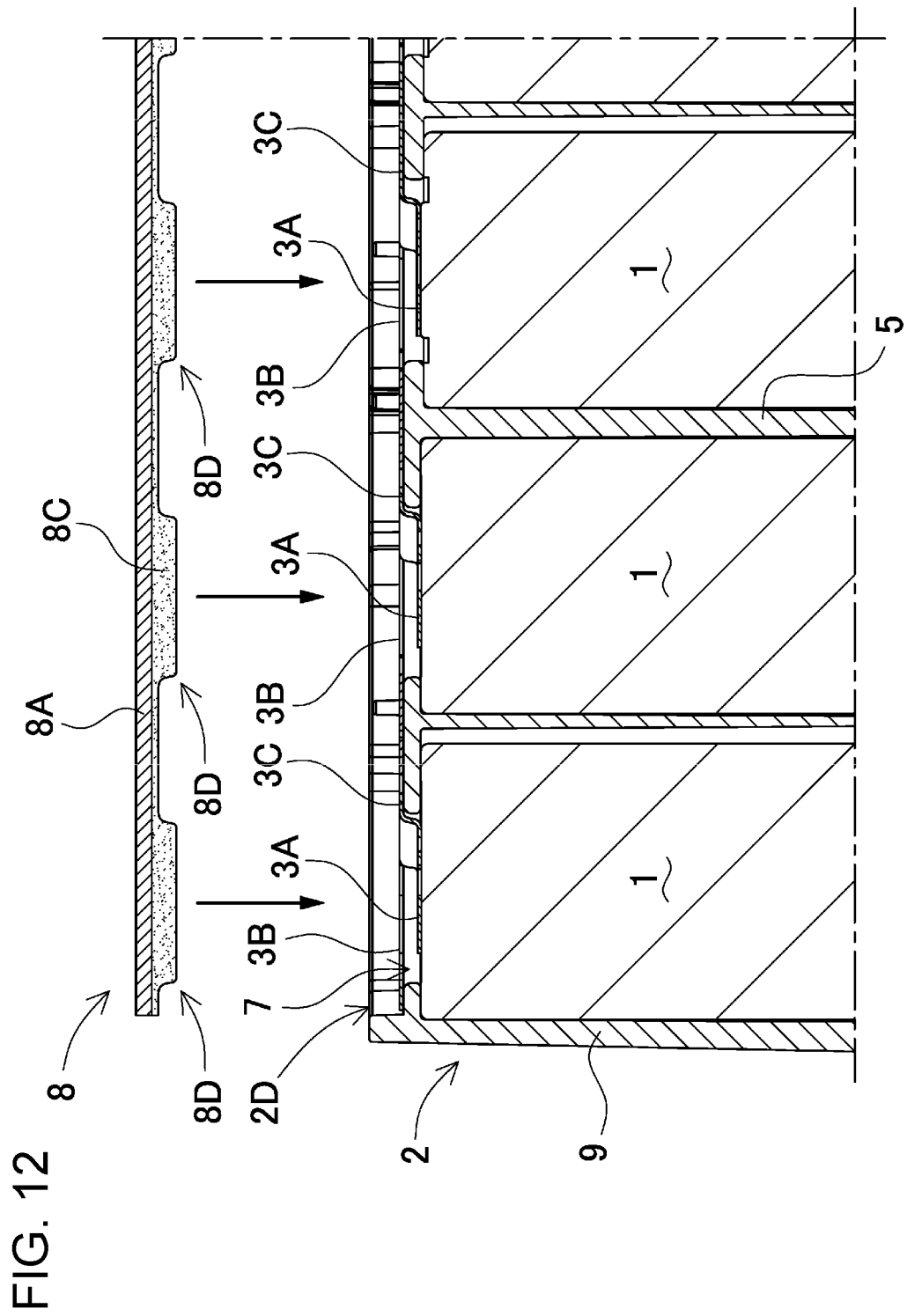
FIG. 12 is an enlarged exploded cross-sectional view of a main portion of a battery pack according to another exemplary embodiment of the present invention.

Resin is molded into each of covers 8A. As illustrated in FIG. 12, soft layer 8C is formed on a surface of cover 8A. A surface of cover 8A on which the soft layer is formed is opposite bus bar 3. Soft layer 8C illustrated in FIG. 12 includes projections 8D at positions opposite hollows and projections that are formed around fuse links 3C and fixed terminals 3A. Since soft layer 8C is pressed against surfaces of fuse links 3C and surfaces of fixed terminals 3A, cover 8A tightly covers surfaces of fuse links 3C and surfaces of fixed terminals 3A, and effectively insulates the surfaces of fuse links 3C and the surfaces of fixed terminals 3A. Soft layer 8C covers fuse links 3C, and functions as an impact absorber. Therefore, cover 8A improves impact resistance of fuse links 3C. If soft layer 8C is an adhesive layer, cover 8A is easily adhered to a surface of bus bar 3.

(External Case 11)

External case 11 illustrated in FIGS. 1 to 3 accommodates battery holder 2. The plurality of cylindrical batteries are disposed at predetermined positions within battery holder 2. External case 11 illustrated in FIGS. 1 to 3 is divided into first case 11A and second case 11B. An accommodating portion is formed within external case 11, and accommodates battery holder 2. Each of first case 11A and second case 11B illustrated in FIG. 3 has a shape like a box, and has a depth that allows substantially a half of battery holder 2 to be accommodated. An end surface of a peripheral wall of first case 11A of external case 11 and an end surface of a peripheral wall of second case 11B of external case 11 are welded to each other by ultrasonic welding, or are connected with each other with adhesive. Fixing screws may be inserted into one case of the first case and the second case. The fixing screws may be inserted into bosses of the other case. Consequently, the first case may be connected with the second case. The fixing screws and the bosses are not illustrated.

In addition to battery holder 2, external case 11 accommodates circuit board 10. Electronic components, such as a protection circuit, may be mounted on circuit board 10. Protection circuit 10 may include a detection circuit that detects a voltage, a remaining capacity, and a temperature of each of batteries 1, and switching elements switched ON or OFF based on the data of batteries 1 the detection circuit detects. The detection circuit and the switching elements are not illustrated. In the battery pack that accommodates the circuit board, an output connector connected with the circuit board may be fixed to external case 11. The output connector includes an output terminal and a signal terminal. The batteries are charged and discharge through the output terminal. Circuit board 10 communicates with connected equipment through the signal terminal. However, the battery pack may not include the output connector. Connection terminals that include an output terminal and a signal terminal may be fixed to the circuit board. The connection terminals may be exposed from a bottom case, and may be connected with outside.

According to the battery pack described before, if any battery 1 is in an abnormal state (e.g., internal short circuit), and thus an overcurrent flows, fuse link 3C connected with battery 1 rapidly melts, and stops the overcurrent. The reason is that heat insulating member 8 tightly covers surfaces of fuse links 3C and surfaces of fixed terminals 3A. Therefore, release of heat from the surfaces of fuse links 3C and the surfaces of fixed terminals 3A to outside is effectively reduced. Therefore, heat is allowed to accumulate in fuse links 3C when any battery 1 is in an abnormal state. According to the battery pack that includes the plurality of batteries 1 arranged in a plurality of rows and a plurality of columns, and are connected with each other in series and in parallel with bus bars 3, as illustrated in FIG. 10, if any battery 1 becomes in an abnormal state due to internal short circuit, for example, abnormal heat is generated within the battery, and an overcurrent flows through battery 1. In FIG. 10, battery 1 at a center in an upper row is in an abnormal state.

According to the battery pack, if battery 1 is in an abnormal state, and a temperature within the battery increases, heat insulating member 8 that covers fixed terminals 3A reduces release of heat from surfaces of fixed terminals 3A. Therefore, heat energy within the battery is efficiently transferred to fuse link 3C from fixed terminal 3A, as illustrated by arrow B in FIG. 10. Consequently, fuse link 3C is effectively heated. When battery 1 of the battery pack is in an abnormal state, an overcurrent flows through fuse link 3C, as illustrated by arrow A, and the overcurrent generates Joule heat, heat insulating member 8 that covers fuse link 3C reduces release of heat from a surface of fuse link 3C. Therefore, Joule heat heats fuse link 3C, and thus a temperature of fuse link 3C rapidly increases to a melting point. Consequently, fuse link 3C melts. Especially since heat insulating member 8 of the battery pack tightly covers surfaces of fuse links 3C and surfaces of fixed terminals 3A, heat accumulates in fixed terminals 3A and fuse links 3C, and thus fuse links 3C are effectively heated.

Experiments were performed. In each of the experiments, a battery pack according to the exemplary embodiment of the present invention that included heat insulating member 8 that covered surfaces of fuse links 3C of bus bars 3 and surfaces of fixed terminals 3A connected with fuse links 3C, respectively, and an conventional battery pack in which surfaces of fuse links and surfaces of fixed terminals were not covered with a heat insulating member were used, and a time was measured that it took for the fuse links to melt when an overcurrent flowed through the fuse links. The battery pack according to the exemplary embodiment used in each of the experiments, and the conventional battery pack used in each of the experiments each included bus bars that were metal sheets and were connected with electrode terminals of batteries. A width of fuse links of the bus bars was 1.5 mm. An electric current of 160 A flowed through the fuse links. A plurality of experiments were performed in each of which a time was measured that it took for the fuse links to melt.

As results of the experiments, it took 0.6 seconds to 0.7 seconds for the fuse links of the conventional battery pack that did not include a heat insulating member to melt. On the other hand, it took 0.2 seconds for the fuse links of the battery pack according to the exemplary embodiment that included the heat insulating member that covered surfaces of the fuse links and surfaces of the fixed terminals to melt. As describe above, in the battery pack according to an aspect of the present invention, the heat insulating member covered surfaces of the fuse links and surfaces of the fixed terminals. Consequently, heat was allowed to accumulate in the fuse links. Consequently, the time it took for the fuse links to melt was reduced to a time that was shorter than or equal to one third of the time it took for the fuse links of the conventional battery pack to melt. According to the structure described before, the time it takes for the fuse links to melt is reduced. Therefore, the fuse links rapidly melt when any battery is in an abnormal state. Therefore, an overcurrent is not rapidly allowed to flow through the battery in an abnormal state. Therefore, safety is ensured.

In the battery pack according to the exemplary embodiment, the heat insulating member covers surfaces of the fuse links and surfaces of the fixed terminals of the bus bars. Consequently, a time it takes for the fuse links to melt is reduced to a time that is shorter than or equal to one third of a time it takes for conventional fuse links to melt. As shown in the fact, even if a width of the fuse links is made wide, or the fuse links are made short, and thus electrical resistance is made low, the fuse links melt rapidly compared with a conventional structure that does not include a heat insulating member. In the battery pack according to an aspect of the present invention, the heat insulating member covers surfaces of the fuse links and surfaces of the fixed terminals. Therefore, even if a width of the fuse links of the bus bars is wider than a width of fuse links of bus bars of a conventional battery pack, and a length of the fuse links of the bus bars is shorter than a length of fuse links of bus bars of the conventional battery pack, a time it takes for the fuse links to melt is shorter than a time it takes for fuse links of the conventional battery pack to melt. Such a wide width or a short length of the fuse links increases strength of the fuse links. Therefore, vibration or an impact is effectively not allowed to damage the fuse links.

As illustrated in FIGS. 6 to 9, in the battery pack described in the above exemplary embodiment, fuse links 3C that are each elongated and S-shaped connect fixed terminals 3A with base 3B. Electrical resistance of fuse link 3C that has the shape is increased if a width of a metal sheet is narrowed, and a total length of fuse link 3C is lengthened. However, a shape of fuse links 3C of bus bars 3 of the battery pack according to an aspect of the present invention may be variously varied. Especially in the battery pack according to an aspect of the present invention, heat insulating member 8 covers surfaces of fuse links 3C and surfaces of fixed terminals 3A connected with fuse links 3C, respectively. Therefore, fuse links 3C rapidly and surely melt even if a width of fuse links 3C is widened, and a total length of fuse links 3C is shortened. Therefore, metal sheets of the fuse links may have a wide width and a long length.

(Another Example of Fuse Link)

Figure 13:
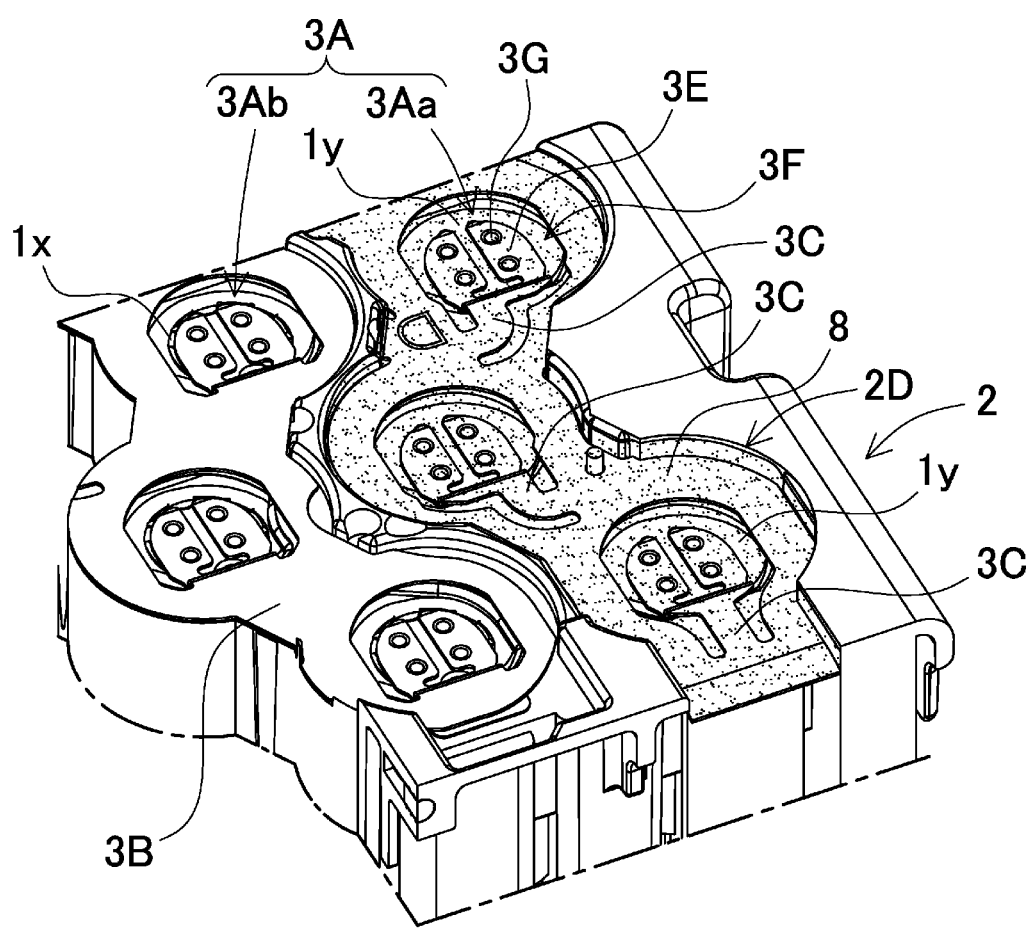
FIG. 13 is an enlarged perspective view that illustrates an internal configuration of a battery pack according to another exemplary embodiment of the present invention.

A battery pack illustrated in FIG. 13 is a battery pack according to another exemplary embodiment of the present invention. A shape of fuse links 3C of bus bars is different from a shape of fuse links 3C of bus bars 3 described before. Fuse links 3C of bus bars 3 illustrated in FIG. 13 connect steps 3D of fixed terminals 3A with base 3B. A shape of fuse links 3C is like a strip that has a uniform width. A shape of some fuse links 3C is like a strip that is curved at approximately 90 degrees and has a predetermined radius of curvature. Alternatively, a shape of other fuse links 3C is like a strip that extends straight. Fuse links 3C of bus bars 3 in FIG. 13 are wider and shorter than fuse links 3C of bus bars 3 described before. As described before, in the battery pack according to an aspect of the present invention, a heat insulating member covers fuse links 3C of bus bars 3 and fixed terminals 3A connected with fuse links 3C, respectively. Therefore, fuse links 3C rapidly melt. Therefore, even if a width of fuse links 3C is widened, and short fuse links 3C are designed as illustrated in FIG. 13, fuse links 3C surely melt at a predetermined assigned temperature.

In the battery pack illustrated in FIG. 13, some bus bars 3 each include a plurality of fuse links 3C, and fixed terminals 3A connected with fuse links 3C, respectively, and connected with electrode terminals 1y, respectively (first fixed terminals 3Aa). Heat insulating member 8 covers fuse links 3C and fixed terminals 3A. On the other hand, other bus bars 3 each include a plurality of fixed terminals 3A connected with electrode terminals 1x, respectively (second fixed terminals 3Ab). Heat insulating member is not on surfaces of other bus bars 3. As described before, according to the present invention, heat insulating member 8 covers fuse links 3C and fixed terminals 3A connected with fuse links 3C. Fixed terminals 3A that are not connected with fuse links 3C may not be covered with the heat insulating member.

INDUSTRIAL APPLICABILITY

The present invention is effectively applicable to a battery pack that accommodates a plurality of batteries in a battery holder, and includes fuse links connected with the batteries to improve safety.

The invention claimed is:

1. A battery pack comprising:
a plurality of batteries that are chargeable and dischargeable;
a battery holder that arranges the plurality of batteries at predetermined positions; and
a bus bar that is a metal sheet fixed to electrode terminals of the plurality of batteries, wherein
the bus bar includes:
  a plurality of fixed terminals connected with the electrode terminals of the plurality of batteries;
  a base that connects the plurality of batteries with each other through the plurality of fixed terminals in series and/or in parallel; and
  fuse links that include ends that are connected with the plurality of fixed terminals, respectively, and roots that are connected with the base, and
the battery pack further comprises a heat insulating member that tightly covers surfaces of the fuse links, and surfaces of the plurality of fixed terminals connected with the fuse links, respectively, wherein
the battery holder puts the plurality of batteries parallel to each other, and arranges, on same planes, the electrode terminals at both ends of the plurality of batteries, and the bus bar connects the electrode terminals of the plurality of batteries with each other at each of both surfaces of the battery holder, and
the battery holder includes a positioning hollow on each of both the surfaces on which the electrode terminals of the plurality of batteries are arranged, the bus bar is disposed in the positioning hollow, and the heat insulating member is disposed in the positioning hollow.

2. The battery pack according to claim 1, wherein the heat insulating member is made of a potting resin.

3. The battery pack according to claim 1, wherein the heat insulating member includes a cover molded with resin, and the cover is tightly fixed to the surfaces of the fuse links and the surfaces of the plurality of fixed terminals connected with the fuse links, respectively.

4. The battery pack according to claim 1, wherein the bus bar includes a plurality of the fuse links, and the heat insulating member is integrally molded to tightly cover surfaces of all the plurality of the fuse links of the bus bar.

5. The battery pack according to claim 4, wherein the heat insulating member is on a whole surface of the bus bar.

6. A battery pack comprising:
a plurality of batteries that are chargeable and dischargeable;
a battery holder that arranges the plurality of batteries at predetermined positions; and
a bus bar that is a metal sheet fixed to electrode terminals of the plurality of batteries, wherein
the bus bar includes:
  a plurality of fixed terminals connected with the electrode terminals of the plurality of batteries;
  a base that connects the plurality of batteries with each other through the plurality of fixed terminals in series and/or in parallel; and
  fuse links that include ends that are connected with the plurality of fixed terminals, respectively, and roots that are connected with the base, and
the battery pack further comprises a heat insulating member that tightly covers surfaces of the fuse links, and surfaces of the plurality of fixed terminals connected with the fuse links, respectively, wherein
the base includes fuse-link connecting portions that are connected with the roots of the fuse links, respectively, and the fuse-link connecting portions include first fitting portions, respectively,
the battery holder includes second fitting portions, and the second fitting portions are connected with the first fitting portions, respectively, and the second fitting portions are connected with the fuse-link connecting portions, respectively,
the second fitting portions are connected with the first fitting portions, respectively, and the fuse-link connecting portions are connected with the battery holder, and
the heat insulating member fixes connections between the first fitting portions and the second fitting portions.

7. The battery pack according to claim 6, wherein the heat insulating member is made of a potting resin.

8. The battery pack according to claim 6, wherein the heat insulating member includes a cover molded with resin, and the cover is tightly fixed to the surfaces of the fuse links and the surfaces of the plurality of fixed terminals connected with the fuse links, respectively.

9. The battery pack according to claim 6, wherein the bus bar includes a plurality of the fuse links, and the heat insulating member is integrally molded to tightly cover surfaces of all the plurality of the fuse links of the bus bar.

10. The battery pack according to claim 9, wherein the heat insulating member is on a whole surface of the bus bar.

11. A battery pack comprising:
a plurality of batteries that are chargeable and dischargeable;
a battery holder that arranges the plurality of batteries at predetermined positions; and
a bus bar that is a metal sheet fixed to electrode terminals of the plurality of batteries, wherein
the bus bar includes:
  a plurality of fixed terminals connected with the electrode terminals of the plurality of batteries;
  a base that connects the plurality of batteries with each other through the plurality of fixed terminals in series and/or in parallel; and
  fuse links that include ends that are connected with the plurality of fixed terminals, respectively, and roots that are connected with the base, and
the battery pack further comprises a heat insulating member that tightly covers surfaces of the fuse links, and surfaces of the plurality of fixed terminals connected with the fuse links, respectively, wherein
the base of the bus bar includes a positioning hole between the plurality of fixed terminals that are adjacent to each other,
the battery holder includes a positioning rib that is guided by the positioning hole and is connected with the bus bar,
the positioning rib is connected with the positioning hole, and the bus bar is connected with the battery holder, and the heat insulating member fixes a connection between the positioning hole and the positioning rib.

12. The battery pack according to claim 11, wherein the heat insulating member is made of a potting resin.

13. The battery pack according to claim 11, wherein the heat insulating member includes a cover molded with resin, and the cover is tightly fixed to the surfaces of the fuse links and the surfaces of the plurality of fixed terminals connected with the fuse links, respectively.

14. The battery pack according to claim 11, wherein the bus bar includes a plurality of the fuse links, and the heat insulating member is integrally molded to tightly cover surfaces of all the plurality of the fuse links of the bus bar.

15. The battery pack according to claim 14, wherein the heat insulating member is on a whole surface of the bus bar.

* * * * *